US006842719B1

United States Patent
Fitzpatrick et al.

(10) Patent No.: US 6,842,719 B1
(45) Date of Patent: Jan. 11, 2005

(54) REAL-TIME PREDICTION AND MANAGEMENT OF FOOD PRODUCT DEMAND

(76) Inventors: Kerien W. Fitzpatrick, 104 Dogwood La., Pittsburgh, PA (US) 15237; R. Craig Coulter, 1719 Coulter Rd., Apollo, PA (US) 15613; Henning M. Pangels, 185 Renfer St., Pittsburgh, PA (US) 15237

(*) Notice: Subject to any disclaimer, the term of this patent is extended or adjusted under 35 U.S.C. 154(b) by 34 days.

(21) Appl. No.: 10/374,410

(22) Filed: Feb. 26, 2003

(51) Int. Cl.[7] .............................................. G06F 11/30
(52) U.S. Cl. ..................... 702/182; 705/15; 340/286.09
(58) Field of Search ......................... 702/182; 705/15; 340/286.09

(56) References Cited

U.S. PATENT DOCUMENTS

| 4,392,119 A | * | 7/1983 | Price et al. .................... 705/32 |
| 4,530,067 A | * | 7/1985 | Dorr .......................... 705/15 |
| 4,935,720 A | * | 6/1990 | Kalfoun ................. 340/286.09 |
| 5,132,914 A | * | 7/1992 | Cahlander et al. .......... 700/211 |
| 5,172,328 A | * | 12/1992 | Cahlander et al. .......... 700/211 |
| 5,602,730 A | * | 2/1997 | Coleman et al. ............... 705/15 |
| 6,026,372 A | * | 2/2000 | Savage ......................... 705/15 |
| 2003/0074239 A1 | * | 4/2003 | Hoffman et al. ............... 705/7 |

* cited by examiner

Primary Examiner—John Barlow
Assistant Examiner—Anthony T. Dougherty

(57) ABSTRACT

A real-time buffer manager system that calculates optimal food buffer levels, for both completed products and product components, based on real-time counts of restaurant patrons throughout a restaurant's property and the estimated time for them to arrive at a food ordering station. The real-time buffer manager employs a computer vision system, running a series of 2D image processing techniques that detect and track vehicles and people in several camera views. Patron counts are fed from the computer vision system into a queuing model that estimates when each patron will arrive at an ordering station. Thus, instead of analyzing historical sales data, the buffer manager according to the present invention electronically performs direct measurement of probable future demand, and electronically predicts, in real-time, what the future food product demand will be in a predetermined time (e.g., 3–5 minutes) immediately following the direct measurement of the demand.

22 Claims, 7 Drawing Sheets

REAL-TIME PREDICTION AND MANAGEMENT OF FOOD PRODUCT DEMAND

BACKGROUND

1. Field of the Invention

The present invention generally relates to the restaurant industry, and, more particularly, to a system and method of real-time electronic prediction and management to of food product demand, especially in quick-service restaurant industry.

2. Description of Related Art

The quick-service (or fast food) restaurant industry's primary value proposition is speed-of-service—i.e., how quickly the restaurant can deliver a complete meal after a customer has placed an order. Quick-service restaurant operations are built upon the concept of preparing a limited menu of food product before customers place their orders. By preparing food ahead of time and keeping it warm in a holding buffer, restaurant employees can quickly grab food product from the buffer, bag it, and hand it to a customer. This faster speed-of-service enables quick-service restaurants to serve many more customers during busy mealtimes than a traditional sit-down restaurant.

In order to efficiently serve the customers (e.g., during a "rush hour"), a restaurant manager must carefully manage the "buffer level"—i.e. the amount of each food product that employees make and store in the holding buffer throughout the day. The restaurant manager needs to ensure that sufficient food product is on hand to meet anticipated demand, but must also ensure that the food product doesn't sit too long before being served, as food product quickly deteriorates after being prepared. Ideally, restaurant managers would like to buffer exactly the right amount of food product to serve consumers over the next few minutes. Unfortunately, it's difficult for managers to know how many consumer orders they will receive over the next few minutes, so they are forced to buffer "extra" product, just to be safe.

The buffer management problem is fundamentally a trade-off between the quality of the restaurant's food and the speed with which the restaurant can serve customers. The management of this trade-off is one of the largest drivers of the restaurant's profitability, as speed-of-service drives sales as long as quality is maintained. Despite its importance to the industry, restaurant managers can do little more than make "educated guesses" as they lack one critical piece of information—when will the consumers arrive?

The restaurant industry's state-of-the art solutions are based on data-mining historical sales information to predict future ordering patterns. Each restaurant saves a multi-week history of its sales volumes for each product. For example, sales data of the past 70 days may be stored and analyzed. The data-mining software then averages product volumes for discrete time windows (called "day parts") throughout the day—e.g., 15 or 30 minute windows are common, for each day of the week. The day-parts printout might suggest, for example, keeping 2 bins of patties on hand from 11:00 to 11:30, and then increasing the buffer to 3 bins from 11:30 to 12:00:

In another approach to buffer management, a program makes the determination of when to buffer completed sandwiches based on the same theory of analyzing historical sales data, except that, in this approach, the sales data for the sale in the last few minutes of popular completed sandwiches (e.g., cheeseburgers) is reviewed. Thereafter, the program calculates the number of completed cheeseburgers to buffer as a function of the number of cheeseburgers sold within the last few minutes. Thus, again, the food production decision is based upon historical information (i.e., sales that have already occurred).

The current approach is based on the underlying assumption that "future product demand will be very similar to historic (or past) product demand". This assumption is relatively true when product demand is averaged over large time windows, for example over a day. Restaurants can have relatively high confidence that they will sell roughly the same number of cheeseburgers today as they did yesterday—assuming that prices do not change.

However, the current approach does not allow restaurant resources to be managed on a real-time basis because the variability of the correlation between past and future demand events is too large. In other words, historic information does not allow restaurant managers to know with confidence the demand that their restaurant will see over the next several minutes; however, restaurant performance (speed and quality) would benefit significantly if product demand could be predicted accurately within the secondary shelf life of the restaurant's food products.

The current approach suffers because it infers future demand from historic demand, rather than taking a direct measurement of future demand. The reliability of the inference (i.e., the correlation between the inferred demand and the actual demand) depends upon the time window under consideration. The current approach works fairly well when demand is correlated across large time windows (e.g., predicting the number of patties that will be consumed across a day). The current approach becomes progressively less accurate as the time window shrinks. Further, current "inventory management systems" are inadequate to the needs of the restaurant industry because they do not account for the limited secondary shelf life of food products.

As a result, data mining of historical sales generates demand estimates with relatively large ranges. For example, in one restaurant, data mining may result in a prediction that for peak periods of the day the kitchen staff should pre-produce 47 bins of burger patties. If each bin holds 18 patties, the range of production is 72 to 126 patties. Such production predictions may be accurate (i.e., the predictions may handle the customer demand during the peak periods) only because the range (which is 126−72=54 patties) is so large. Unfortunately, large variances leave the restaurant vulnerable to over-production and, in practice, provide little more than rough production guidelines.

The area of management of food processing and food production facilities, such as the preparation of frozen dinners, differs significantly from the production problems in quick-service restaurants because it is not a real-time management of food processing and food production. Processing facilities schedule production and make production decisions based upon sales forecasts that are weeks and months ahead. Production times and rates can vary far more than in quick-service restaurants, with little effect, as the output of the facility is destined for warehousing and distribution facilities. Where quick-service restaurants must make minute-by-minute decisions, production facilities can often afford to make daily, or even weekly production decisions. Thus, the needs of production facilities and quick-service restaurants vary greatly. The decisions to be taken at a food processing facility are not impacted by the minute-by-minute changes in the demand for that facility's products.

Therefore, it is desirable to improve a restaurant's demand prediction accuracy so as to enable restaurant mangers to use their production resources more efficiently—increasing same store profitability by improving speed-of-service, food product quality, and reducing food product wastage. More accurate demand prediction enables restaurant operations to:

(1) Avoid underproduction because under-production slows the restaurant's speed-of-service. When the buffer runs out of a certain food product, then customers must add the food production time (often a few minutes) to their wait time. This is especially problematic for a serial queue, like a drive-thru where every customer in line must add the food production time to his or her wait time. Underproduction can seriously damage the restaurant's profitability by reducing the number of customers served during peak meal times.

(2) Avoid over-production because over-production reduces the restaurant's food quality and increases wastage, as food product spends too much time in the bin. If the food product's bin time exceeds the secondary shelf life, then it must be wasted.

(3) Minimize bin time because minimizing bin times means hotter, fresher food products—a well-known market share driver. Restaurants would prefer to minimize the amount of time that food products spend in the buffer.

(4) Pre-produce completed products because accurately buffering completed products can significantly drive the restaurant's sales by improving the restaurant's speed-of-service. Restaurants can buffer both food product components (e.g., burger patties) and completed food products (e.g., plain cheeseburgers); however, the secondary shelf life of a completed food product is much shorter (2–3 minutes) than that of a food product component (30 minutes).

(5) Reduce "wasteful" production when a restaurant attempts to buffer completed food products based on the historical sales data approach. This method is open to a significant number of incorrect guesses, which not only waste the food product (e.g., unused sandwiches or cheeseburgers), but also consume valuable production time that was allocated to making a product that no one used.

As discussed before, a fundamental limitation of the current approach is that the analysis of historical data only infers a range of probable future demand. It is therefore further desirable to improve the accuracy of future demand prediction using a method that moves beyond inference—to a direct measurement of demand or leading indicators of demand. In other words, it is desirable to base future food production decisions on the number of customers currently on the restaurant property who have not yet placed orders (i.e., sales that have not yet occurred, but are likely to occur within the next several minutes). Direct measurements of demand will enable restaurants to improve the economic efficiency of their real-time production operations—ensuring that production resources are assigned to profit-enhancing tasks.

SUMMARY

In one embodiment, the present invention contemplates a method of managing food supply in real time. The method comprises electronically generating real time data about food consumers inside or in the vicinity of a food outlet; and electronically predicting, based on the real time data, an amount of food to be ordered by the food consumers in a predetermined time interval immediately following the generation of the real time data. The method also includes electronically performing at least one of the following in real time: estimating impending food product demand in view of the prediction of the amount of food to be ordered by the food consumers; and estimating demand for each completed food product available for consumer consumption.

In another embodiment, the present invention contemplates a method of managing food production and delivery in real time. The method comprises electronically predicting, based on real time data, an amount of food to be ordered at a food outlet in a specified time interval immediately succeeding a generation of the real time data; preparing the amount of food predicted to be ordered; and serving prepared food to patrons of the food outlet.

In a still further embodiment, the present invention contemplates a computer-readable data storage medium containing a program code, which, upon execution by a processor, causes the processor to perform the following in real time: generate data about food consumers inside or in the vicinity of a food outlet; and predict, based on the data, an amount of food to be ordered by the food consumers in a predetermined time interval immediately following the generation of the data.

A real-time buffer manager system according to the present invention calculates optimal food buffer levels, for both completed products and product components, based on real-time counts of restaurant patrons throughout a restaurant's property. The real-time buffer manager employs a computer vision system, running a series of 2D image processing techniques that detect and track vehicles and people in several camera views. The system's cameras may be pointed at any of several key locations throughout the restaurant's property, including the property's entrance and exits, the drive-thru lane, the parking area, the restaurant's entrance and exit doors, and the front counter area. Patron counts are fed from the computer vision system into a queuing model that estimates when each patron will arrive at an ordering station. Simultaneously, a parametric observer takes inputs from the kitchen crew to track several key pieces of production information including the number of products and components in the food buffer, and average service times for ordering and production. The buffer manager estimates, in real-time, the probable demand for completed food products and food product components, based on the number of patrons detected and the estimated time for them to arrive at an ordering station. This information is displayed to the kitchen crew, who then can prepare the required food products and food product components. Thus, instead of analyzing historical sales data, the buffer manager according to the present invention electronically performs direct measurement of probable future demand, and electronically predicts, in real-time, what the future food product demand will be in a predetermined time (e.g., 3–5 minutes) immediately following the direct measurement of the demand. The buffer manager may also manage restaurant employees.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Reference will now be made in detail to the preferred embodiments of the present invention, examples of which art illustrated in the accompanying drawings. It is to be understood that the figures and descriptions of the present invention included herein illustrate and describe elements that are of particular relevance to the present invention, while eliminating, for the purpose of clarity, other elements found in typical quick-service (or fast food) restaurants.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment. It is further noted that although the discussion below refers to a quick-service or fast food restaurant, the discussion equally applies to any restaurant or food outlet and is not limited to a fast food restaurant setting. Further, the term "food" may include a "solid" (e.g., burger, fries, sandwiches, etc.) as well as a liquid (e.g., coffee, carbonated drinks, juice, etc.) edible product. Also, the term "buffer manager", as used hereinbelow, refers to a computer unit, computing software, or any other electronic device that is configured to electronically perform real-time prediction of food demand by executing various steps as illustrated, for example, in FIG. 4. The buffer manager may operate in conjunction with one or more sensors and other data input devices as discussed below with reference to FIG. 2. Such generally-available sensors or data input devices may or may not form part of the entire buffer management system according to the present invention depending on the type of implementation as discussed with reference to FIGS. 2 and 3 below.

Figure 1:
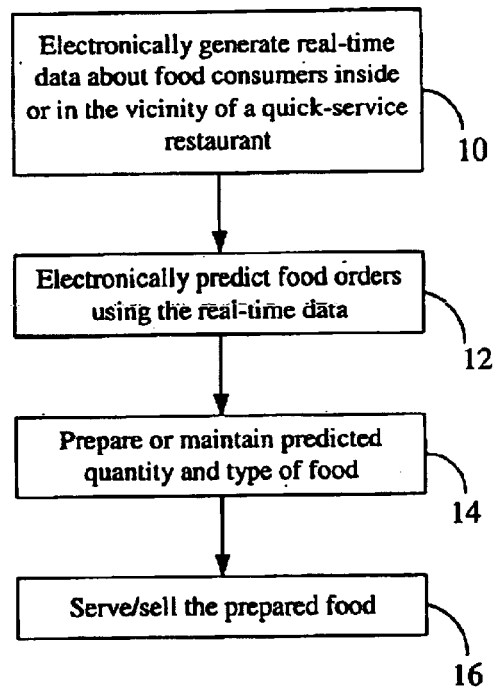
FIG. 1 illustrates a general flowchart depicting steps involved in operating a quick-service restaurant according to one embodiment of the present invention.

FIG. 1 illustrates a general flowchart depicting steps involved in operating a quick-service restaurant according to one embodiment of the present invention. A food buffer manager according to one embodiment of the present invention electronically generates, in real-time, data about food consumers inside or in the vicinity of the quick-service restaurant (block 10). A food buffer is the holding buffer in a quick-service restaurant where food that is prepared ahead of time is kept warm and from which restaurant employees can quickly grab the ordered food product, bag it, and hand it to the customer. Generally, there are two kinds of food buffers in a quick-service restaurant: those that hold completed food products (typically called "bins"), and those that hold cooked food product components (typically called "cabinets" or "component buffers"). The restaurant employees can quickly fulfill an order by custom making a sandwich from the food product components that are stored in a cabinet or component buffer. The buffer manager calculates optimal buffer levels based on measurements of impending demand in real-time. The buffer manager may be distinguished from the traditional methods, where buffer level calculations are not determined from real-time demand measurements, but from historical demand measurements.

The demand that a quick-service restaurant will see over the next 3–5 minutes can be quickly estimated manually by standing on the roof of the restaurant and watching the traffic flow through the property. It is assumed that people are coming to the restaurant to buy food. If it can be known how much food the average person orders, then one can form a good estimate of how much food needs to be cooked ahead of time, simply by counting cars. The buffer manager may calculate optimal buffer levels, for both completed products and product components, based on real-time counts of restaurant patrons throughout the restaurant's property (block 10, FIG. 1). In one embodiment, as discussed in more detail later, the buffer manager employs a computer vision system, running a series of 2D image processing techniques that detect and track vehicles and people in several camera views. The system's cameras may be pointed at any of several key locations throughout the restaurant property, including the property's entrance and exits, the drive-thru lane, the parking area, the restaurant's entrance and exit doors, and the front counter area. Thus, the buffer manager, when installed with appropriate sensors, monitors customer flow and estimates food production needs in real-time.

Computer vision technology may be used to measure leading indicators of impending demand including, for example, the arrival and movement of people and vehicles throughout the restaurant's property. The number of burger patties and fries (for example) that the restaurant will need to cook can be quickly estimated from the number of cars entering the property. More accurate estimates of when these products will be ordered can be made by noting how long it takes for patrons to reach an order panel. The buffer manager can also observe how many vehicles are in the drive-thru and how quickly the drive-thru is moving to estimate when future drive thru orders will be placed. The buffer manager can also note how many vehicles are parked, how long it takes for customers to walk from their vehicles to the counter, and how long it takes for employees to take a customer order, to estimate when future counter orders will be placed. Thus, the demand indicators may also include, for example, customer ordering pattern, drive-thru delay, waiting time before ordering, time taken by an employee to take an order, etc.

Patron counts are fed from the computer vision system into a queuing model (also a part of the buffer manager) that estimates when each patron will arrive at an ordering station. Simultaneously, a parametric observer may take inputs from the kitchen crew to track several key pies of production information including the number of products and components in the buffer, and average service times for ordering and production. The buffer manager may then electronically estimate the probable demand for completed food products and food product components as a function of time, based on the number of patrons detected and the estimated time for them to arrive at an ordering station as given at block 12 in FIG. 1. The prediction of food orders using nal time data may then be displayed to the kitchen crew or sent as direct commands to appropriate automated food production equipment, who can prepare or maintain the required food products and food product components (block 14) for serving or selling to the restaurant patrons (block 16).

Figure 2:
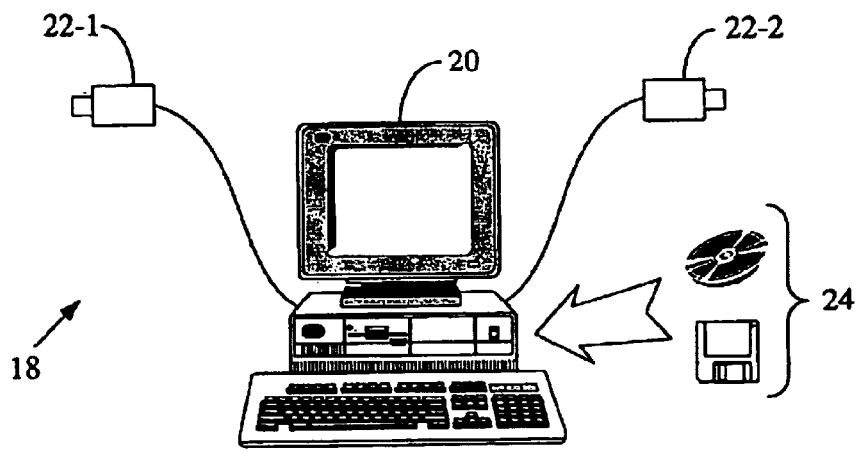
FIG. 2 shows an exemplary food buffer manager system according to one embodiment of the present invention.

FIG. 2 shows an exemplary food buffer manager system 18 according to one embodiment of the present invention. The system 18 may include a computing unit 20 that receives and processes data received from a number of sensors 22-1, 22-2 located/placed inside and in the vicinity (or surrounding) a quick-service restaurant building. Although only two sensors 22-1 and 22-2 are illustrated in FIG. 2, it is observed that there may be many more sensors feeding data (e.g. customer arrival, drive-thru car progress, etc.) to the computing unit 20 as illustrated, for example, in FIG. 3. The computing unit 20 may internally store (e.g., in the unit's hard drive or other permanent storage memory/facility within the unit) appropriate program code that, upon execution by one or more processors in the computing unit 20, may allow the computing unit 20 to perform the buffer manager functionality. In one embodiment, the computing unit 20 is a Windows® based personal computer. However, a computer running on any other operating system (e.g., Linux®) may also be configured to perform the buffer manager functionality. The program code may be written in C, C++, or in any other compiled or interpreted language suitably selected. The necessary software modules for the program code may be designed using standard software tools including, for example, compilers, linkers, assemblers, loaders, bug tracking systems, memory debugging systems, etc.

On the other hand, as shown in FIG. 2, the program code may reside on an external computer-readable, tangible data storage medium 24 (e.g., a compact disc, an optical disc, a magnetic storage medium such as a floppy disk, etc.) allowing ease of software portability and system management. More updated version of the program code may then be easily loaded onto the internal memory of the computer 20 to enable the computer 20 to perform more sophisticated and advanced data and image processing operations.

Customer arrival measurement (as discussed later hereinbelow) may be performed with any of a number of sensors 22 including mechanical, electrical, and chemical sensors. Mechanical sensors may include a wide variety of switches, such as piezo electrics, pneumatic pressure switches, etc. Electrical sensors may include magnetic loop sensors, laser beam switches, and cameras (e.g., video surveillance cameras). Chemical sensors may also be used to detect vehicle passage by measuring changes in CO (carbon monoxide) emissions. A particular implementation of a single type of sensors or a combination of different types of sensors 22 may be based upon the relative cost/benefit of the approach. Some other sensing methods and approaches include:

(1) Radiative Sensing—The application may require a sensor capable of detecting vehicles and people though the restaurant's property. Radiative sensors such as cameras, lasers, or sonar may be used to sense such objects in a relatively large field of view and at a distance. The ability to detect an object far from an ordering panel, in order to provide the kitchen with sufficient warning, especially recommends the use of radiative sensing. In one embodiment, the radiative sensing is used to provide a 2D (two dimensional) image of the field of view of interest. Alternative sensors may also be used to extract 3D (three dimensional) information from the same general field of view. The use of multiple cameras, for instance, may be used in conjunction with stereovision techniques to generate a 3D model of an object in the field of view. Similarly, sonar sensors may be used with certain 3D processing techniques to generate 3D occupancy models for a given field of view. These and other techniques may be employed to construct a 3D image of the object in the field of view.

(2) Contact or Field Sensors—A general alternative to radiative sensing is to employ some type of contact or field sensor, such as a limit switch, a pressure switch or a magnetic loop sensor. For example, a mechanical pressure switch may be laid across the restaurant entrance, generating a "click" each time a car drove across the switch. However, there may not be desirable cost/performance for a pressure switch. There may be multiple problems with these sensors in practice, including: (i) Pressure sensors may actually cost more than a camera; (ii) Multiple sensors may be required to determine whether a vehicle is entering or exiting; (iii) Vehicles may only be detected and counted while in motion—a problem in the drive-thru where a vehicle may not move for some time; (iv) Error propagation grows as the sum of misinterpreted clicks; and (v) Difficult to generalize techniques to also detect people (as opposed to just detecting the vehicles). Thus, generally, although an acceptably accurate vehicle detection system can be built using contact or field sensors, the cost in practice may be too high for the achievable performance and reliability.

It is noted here that as it is not difficult to reliably detect vehicles in a parking lot of a restaurant when one knows roughly where to look, and what to look for, the designer of the buffer management system according to the teachings of the present invention may have a wide selection of available sensing techniques from which to develop an acceptably accurate vehicle (and people)-detection system.

Figure 4:
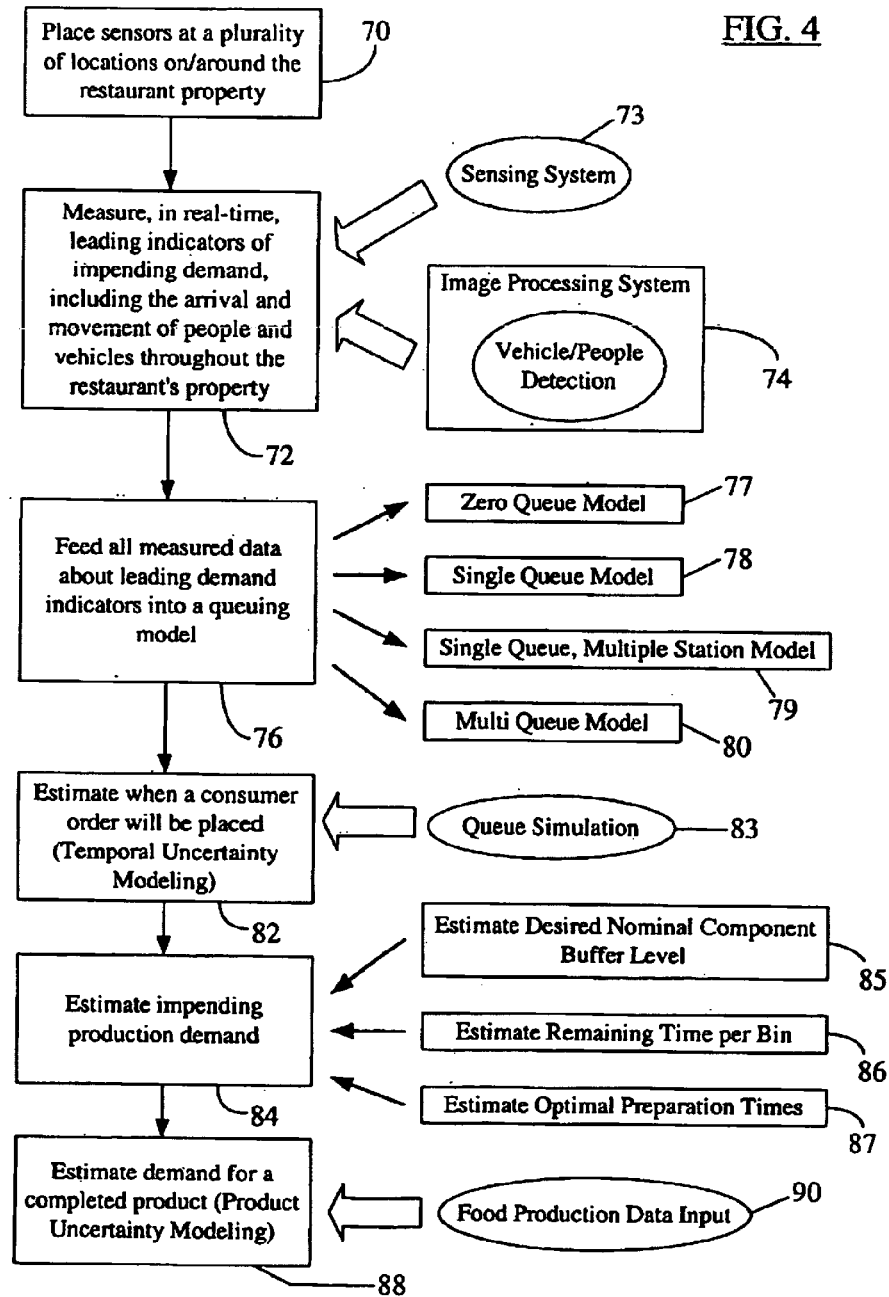
FIG. 4 is a detailed flowchart showing exemplary steps involved in measurement and prediction of impending food demand in real-time according to one embodiment of the present invention.

As noted before, the term "buffer manager" may thus include the computer 20 with the program code stored therein to allow it to perform the buffer manager functionality according to the present invention (as illustrated, for example, in FIG. 4). However, the entire system 18 may be considered a "buffer manager" if, for example, a restaurant operator wishes to install sensors 22 and the computer 20 together from a single vendor instead of obtaining the computer unit 20 from one vendor and the sensors 22 from another. On the other hand, instead of a single computer 20, there may be more than one computing or processing units who jointly perform the buffer manager functionality as is done in a preferred embodiment discussed immediately below. In other words, the buffer manager functionality may be distributed among two or more processing units connected to one another via a network (e.g., the Ethernet) connection. Thus, the term "buffer manager" is used flexibly throughout the discussion and its meaning should be evident from the context of use.

In a preferred embodiment, the sensors 22 for drive-thru and customer arrival areas are Vision-Tech black and white, weatherproof, standard security cameras with each camera rated at 0.5 lux and 380 line resolution. The functionality of the computer 20 is implemented via three hardware components—all connected to one another via an Ethernet connection. The first hardware component is a demand prediction system that receives signals sent by the cameras. The first hardware component is a Shuttle SS50C computing system with Intel P4 (2 GHz) processor, 512 MB RAM, 20 GB hard disk space, and two (2) Winnov 1020 framegrabbers. The second hardware component is a manager console, which is a Shuttle SS50C system with Intel P4 (2 GHz) processor, 256 MB RAM, 20 GB hard disk space, and a 10 Base 2 network card. The third hardware component is a kitchen production system, which is a Dell GX300 computer system with Intel P3 (800 MHz) processor, 256 MB RAM, 10 GB hard disk space, built-in network card, two (2) integrated serial ports, integrated video, ATI video card (PCI), STB video card (PCI), and two (2) serial port expansion slots (PCI). The display of various information to the restaurant employees and data input from them into the buffer manager system are achieved via a number of serial-touch display terminals or interfaces. The display terminals or interfaces may be placed at a number of locations in the restaurant. In one embodiment, one display interface is placed at the grill area in the kitchen, the other is placed at the frying area in the kitchen, and a third one is placed at the food assembly area. Each display terminal or interface is a Datalux MLC 10 LCD touchscreen monitor with 640×480 resolution, 200 nit brightness, and 250:1 contrast.

Figure 3:
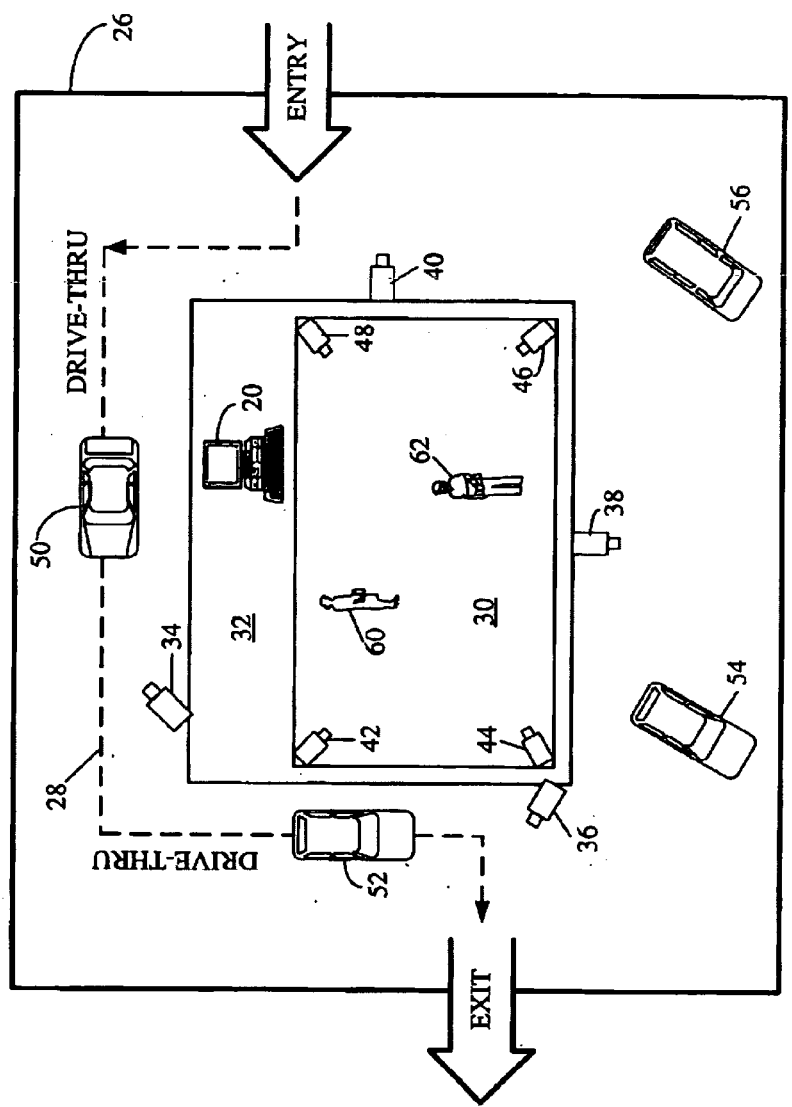
FIG. 3 is a depiction of a real life implementation of the buffer manager system in FIG. 2 in a quick-service restaurant.

FIG. 3 is a depiction of a real life implementation of the buffer manager system in FIG. 2 in a quick-service restaurant 26. The restaurant 26 is schematically depicted to have a drive-thru section 28, an eat-in/ordering area 30, and a front counter/order-taking area 32, which may include the food preparation/kitchen area (not shown separately). The computer unit 20 (also shown in FIG. 2) that is configured to perform the buffer manager functionality using the software or program code developed to implement the teachings of the present invention is shown placed in the counter area 32. The drive-thru section 28 is shown to have two vehicles 50, 52 in the ordering lane. The diagram in FIG. 3 also shows the entry and exit areas on the restaurant property. A couple of other vehicles (or cars) 54, 56 are also shown parked in the parking space provided for customers who wish to enter the restaurant and order and eat-in food there. It is observed that the diagram in FIG. 3 is just a schematic representation of a fast food restaurant or outlet, with two representative customers 60, 62 shown in FIG. 3. In reality, there may be many more cars or other vehicles on the restaurant property, there may be many customers inside the restaurant (i.e., in the eat-in area 30), or there may be more or less sensors placed at the restaurant than those shown in FIG. 3.

As discussed before, various types of sensors may be placed in and/or around the restaurant property. In FIG. 3, one such implementation is shown with four sensors 34, 36, 38, 40 located on the four outside walls of the restaurant eat-in establishment to detect and track vehicles and human traffic throughout the property, including the property's entrance and exits, the drive-thru lane, the parking area, the entrance and exit doors (not shown) of the eat-in area 30, etc. Similarly, four other sensors 42, 44, 46, and 48 are shown placed at different angular locations within the eat-in area 30 to monitor the front counter area 32 and also to monitor, for example, the number of patrons inside the establishment, the ordering pattern of the customers inside the restaurant building, how long it takes for a restaurant employee to take a customer's order, etc. As noted before and discussed in more detail later hereinbelow, various parameters tracked and measured by the sensors are sent to the buffer manager 20 in real-time, which analyzes the sensor output data so as to estimate or predict, in real-time, the food product demand that the restaurant may experience in a predetermined time (e.g., next 3–5 minutes) immediately following the sensor measurements.

It is observed here that although FIG. 3 shows the buffer manager 20 to be an integral part of the restaurant 26, that may not have to be necessarily so. For example, the buffer manager 20 may be physically located at a remote location (e.g., a central headquarter of the restaurant franchisor, or at another restaurant in a chain of restaurants under common ownership) and only a display monitor or computer terminal may be provided in the counter area 32 to guide and instruct the kitchen staff. In such a setup, the remotely located buffer manager 20 may be linked or connected to one or more "client" restaurants via one of many available high-speed data connection options, including, for example, cable-modems, WLL (wireless local loop) or any other wireless network, the Internet or any other similar data communication network, etc. The monitored data output from the sensors located at "client" restaurant may be sent over the high-speed connection to the remotely located buffer manager, which, in turn, may interpret (or process) the data supplied by the specific group of sensors at a specific restaurant and send back necessary food production and maintenance information (i.e., its prediction of impeding food orders) to that specific restaurant to guide the kitchen staff in food preparation. The operations of a buffer manager computer may be remotely monitored (preferably periodically) by another computer (not shown) to diagnose and prevent any malfunction or fault condition occurring at the buffer manager level. In one embodiment, food orders may be taken over a network (e.g., the Internet). In another embodiment, a food order delivery notification may be sent to a consumer over the network and the consumer, in turn, may pick up the ordered food at a designated location.

FIG. 4 is a detailed flowchart showing exemplary steps involved in measurement and prediction of impending food demand in real-time according to one embodiment of the present invention. It is noted that although the steps in FIG. 4 are illustrated in a sequential order, it is clear from the discussion given hereinbelow that one or more of the steps in FIG. 4 can be performed in a order that is different from that shown in FIG. 4. For example, the steps at blocks 84 and 88 in FIG. 4 can be performed simultaneously, i.e., these steps do not have to be performed sequentially. It is observed that the steps outlined in FIG. 4 are implemented using the buffer management system 18 shown in FIG. 2. In other words, upon receiving sensor outputs, the buffer manager 20 processes the received data to electronically carry out all the steps (except step 70) illustrated in FIG. 4. The placement of sensors at a plurality of locations on or around the restaurant property (block 70) is already discussed hereinbefore with reference to FIG. 3. The sensors may comprise the sensing system 73, whose output is processed (in real-time) by the image processing system 74 to measure, in real-time, the leading indicators of impending demand, including, for example, the arrival and movement of people and vehicles throughout the restaurant's property, waiting time, ordering pattern, drive-thru delay, etc. The data measured at block 72 is fed as an input to an appropriate queuing model (discussed later hereinbelow) to estimate time of arrival for each patron at the front counter/ordering panel. Each queuing model shares a common set of model parameters—the arrival time and the service time. The arrival time indicates the time at which a new patron (person or vehicle) enters the queue (including the drive-thru queue). The service time indicates the amount of time spent servicing an individual patron prior to that patron exiting the queue. These model parameters may be estimated, either through direct measurement or the construction of a parametric observer.

The queuing models predict the time at which a customer will reach an order panel based on the customer's arrival time, the number of other customers in the queue, and the queue's average service time. In one embodiment, the buffer management system 18 uses cameras and 2D image processing techniques to measure the arrival time of each customer.

Sensing System 73

Various types of sensors and their utilities are described hereinbefore. Although a preferred embodiment uses cameras and 2D image processing techniques to measure the arrival time of each customer, however, as noted before, the buffer management according to the present invention can be equally performed with any of a number of other sensor and data processing techniques. Cameras and 2D image processing may be chosen primarily due to cost constraints. 3D sensing techniques, albeit more expensive, may be preferable for higher performance results. Fundamentally, the arrival time measurement system provides for the accurate detection and/or tracking of an object within a field of interest. The field of interest must be located far enough away from the ordering panel (i.e., the front counter area 32 in FIG. 3, which includes one or more ordering windows for drive-thru customers) such that detection of an arriving object provides the restaurant with sufficient warning that the kitchen can take action before the customer arrives at the ordering panel.

A sensor's required look-ahead may be determined from the restaurant's usual performance characteristics. If the restaurant requires an average service time $T_b$ to perform a task, such as cooking a batch of fries, or preparing a batch of burgers; and an average service time $T_a$ to assemble a burger, then the sensor should be placed at least $S*(T_a+T_b)$ from the order panel. The parameter S, in this case, indicates the average speed of the consumer. Sensor placement is a function of the restaurant's performance—higher performance restaurants do not require as much warning time to react to changes in consumer demand.

Image Processing System 74

In one embodiment, the buffer manager 20 employs 2D image processing of several camera images in order to detect customers throughout the restaurant's property. It is noted that each queuing model may require a potentially different set of customer arrival measurements. The following discusses several 2D image-processing algorithms that are used for object detection, localization, and/or tracking. In addition, image-filtering methods that improve the quality of the image-processing algorithms are also discussed. It is again noted that there are several alternative methods of implementing object detection. The methods described herein have been chosen for their cost/performance benefits in certain vehicle/people detection applications according to one embodiment of the present invention.

Figure 5:
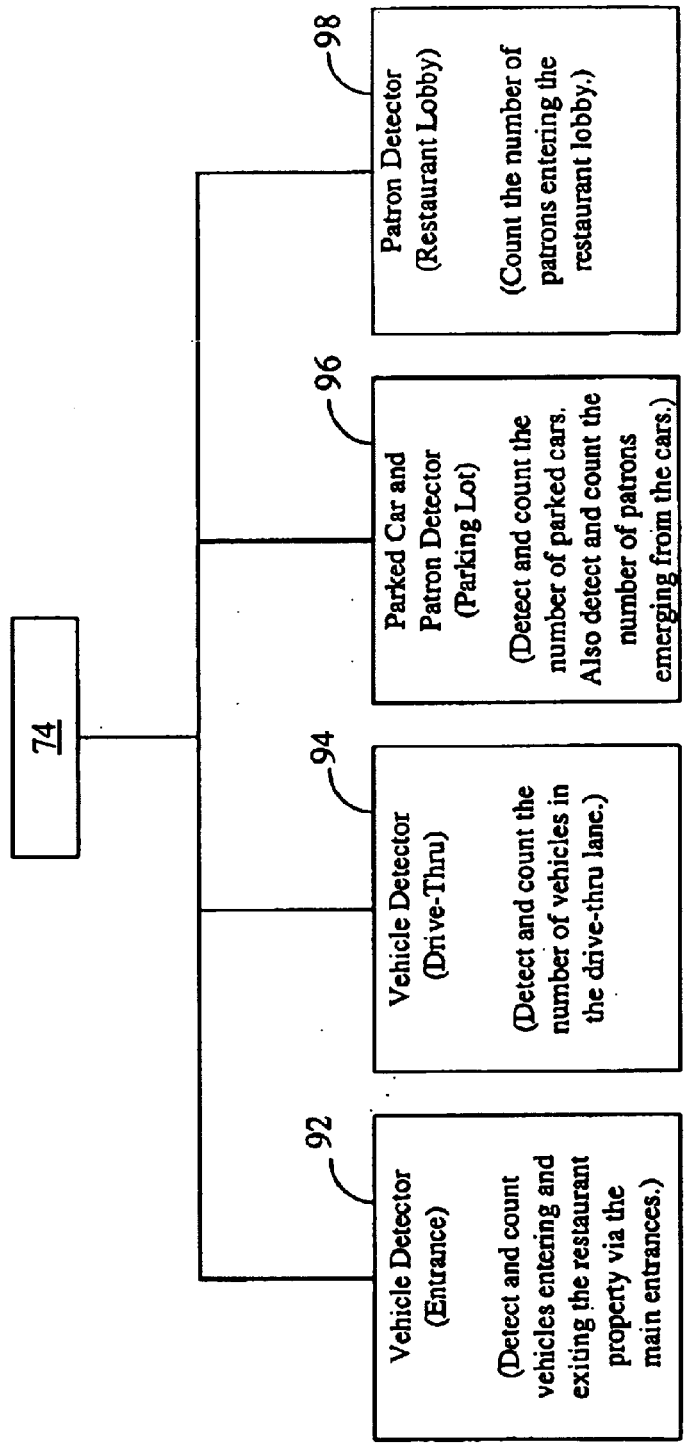
FIG. 5 shows various detector units employed by an exemplary buffer manager as per the teachings of the present invention.

FIG. 5 shows various detector units employed by an exemplary buffer manager as per the teachings of the present invention. The software module that performs people and/or vehicle detection in the image processing system 74 may include one or more of the following detector units: (i) an entrance vehicle detector 92 that detects and counts vehicles entering and exiting the restaurant property via restaurant's main entrance, (ii) a drive-thru vehicle detector 94 that detects and counts the number of vehicles in the drive-thru lane, (iii) a parking lot detector 96 that detects and counts the number of parked cars, and also detects and counts the number of patrons emerging from the cars, and (iv) a restaurant lobby detector 98 that counts the number of patrons entering the restaurant lobby or eat-in area 30.

Figure 6:
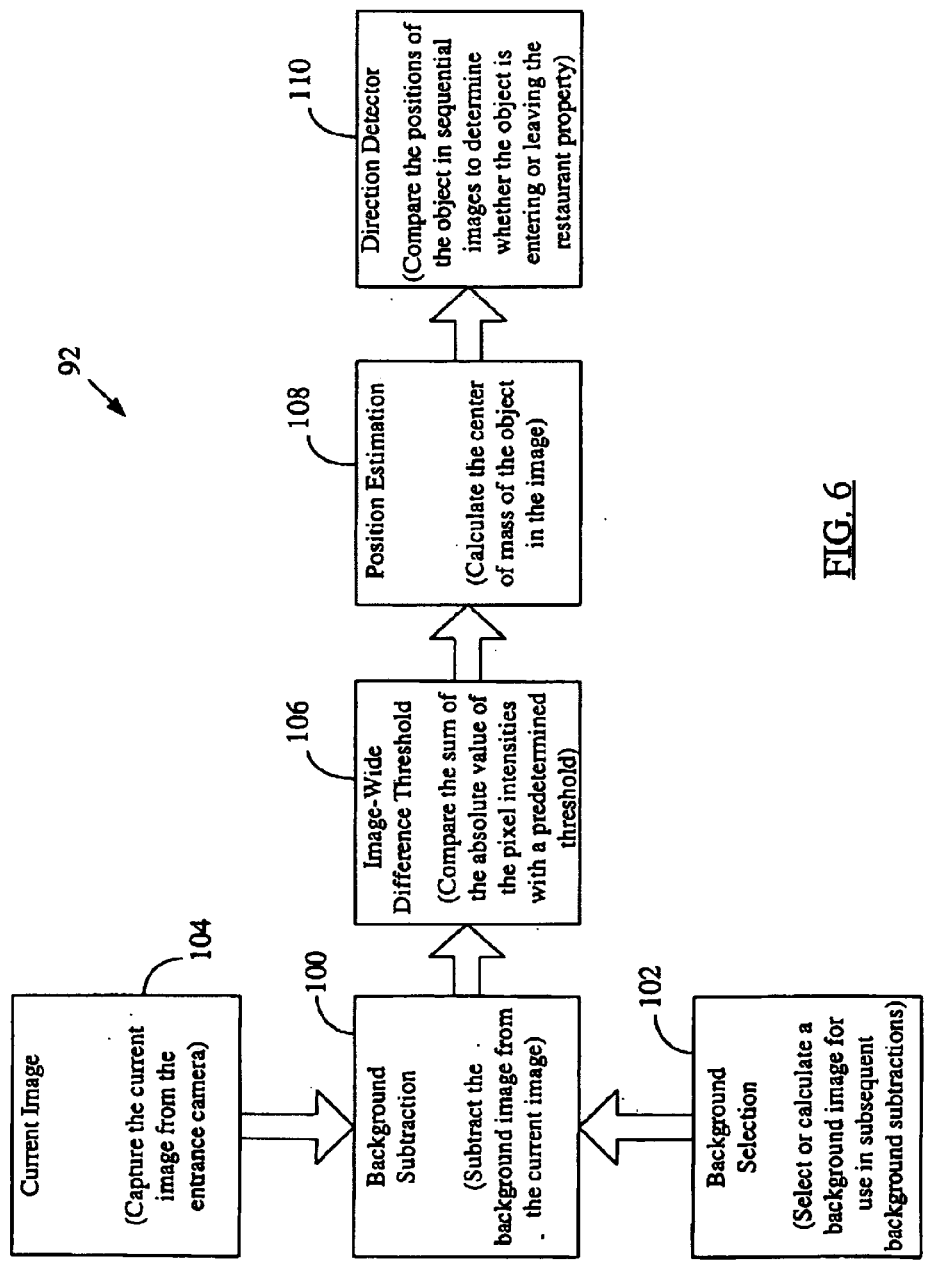
FIG. 6 illustrates an exemplary entrance detector architecture.
Figure 7:
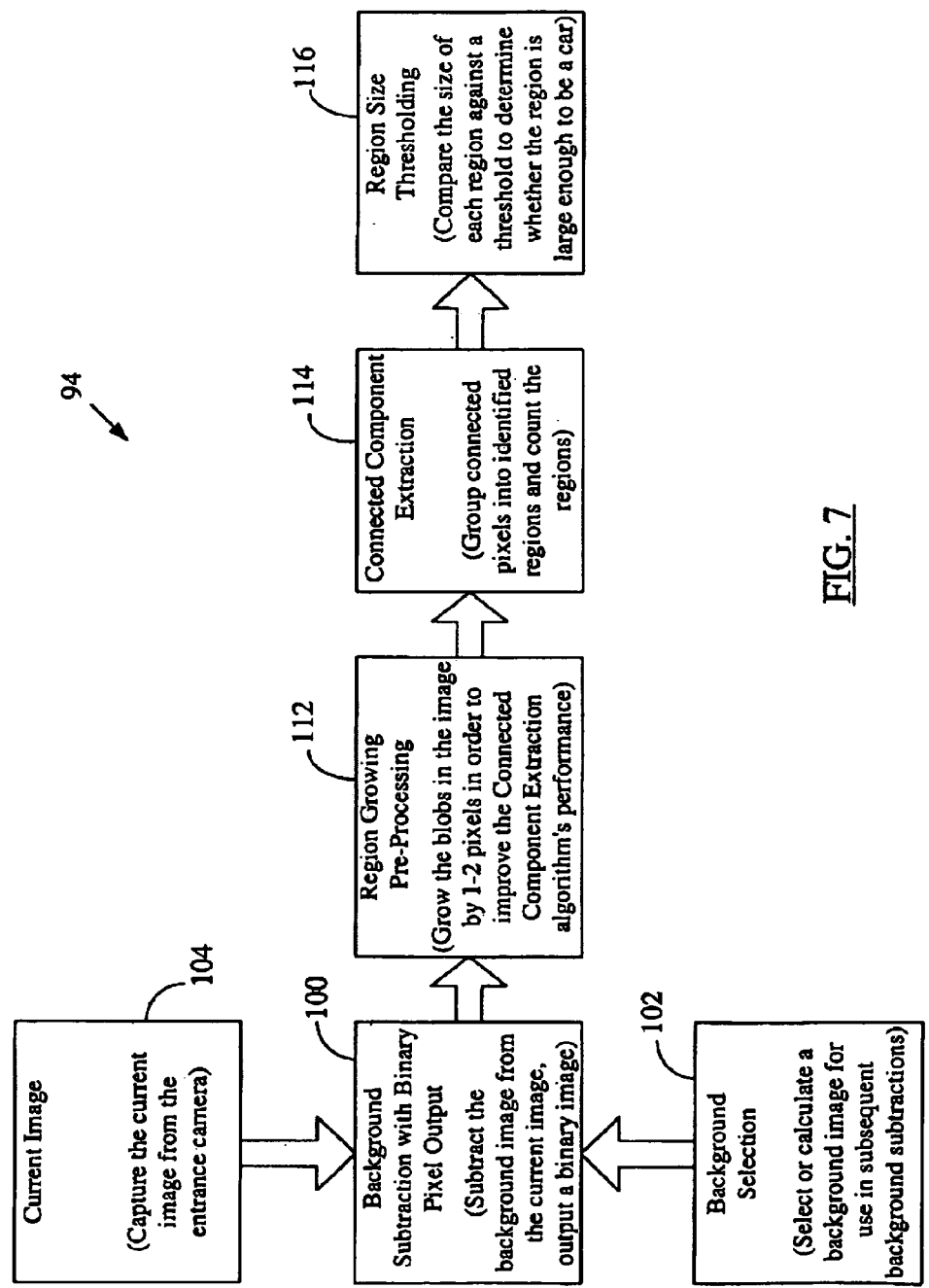
FIG. 7 shows an exemplary drive-thru detector architecture.

FIG. 6 illustrates an exemplary architecture for the entrance detector unit 92, and FIG. 7 shows an exemplary architecture for the drive-thru detector unit 94 illustrated in FIG. 5. Image differencing is initially performed as indicated by blocks 100, 102 and 104 in FIGS. 6 and 7.

Arrival Detector Implementation

The detection of arrival of a vehicle (e g., a car) may be implemented by analyzing a live stream of images supplied by, for example, an entrance camera, and then signaling a software event when a car has entered the restaurant property. In one embodiment, the overall flow of this analysis is broken down into three major processing steps, labeled $P_n$, as follows: (1) $P_1$: Every image frame is processed to determine whether or not a car, or significant portion of a car, is present in the image. In a preferred embodiment, the image differencing method (described immediately below) is used to implement this $P_1$ processing step. (2) $P_2$: If two consecutive frames are deemed to contain a car, they are compared to determine the direction of motion of the car. The result of this comparison is a "vote" for one of the following four outcomes: (i) "A"—Arrival, i.e., the car is moving in a direction consistent with entering the property. (ii) "D"—Departure. (iii) "S"—Stationary, i.e., the car doesn't appear to move between two successive frames. (iv) "I"—Indeterminate, i.e., in some cases, the image data doesn't allow for a conclusive determination of the car's direction. The implementation of detection of motion or direction of a cat in a preferred embodiment is described below. (3) $P_3$: During a sequence of more than two consecutive frames containing a car, the votes generated by $P_2$ for each frame transition are tallied until a frame is found that does not contain a car. At this time, a software event is generated containing the outcome of this voting process. The signaling of a detection event is described below.

Image Differencing—A Filtering Method "Background subtraction" or "image differencing" (block 100) is an image filtering method that calculates the difference in pixel values between two images. This filtering method is useful in the detection of objects such as automobiles in a fixed field of view. The output of image differencing may be run through a threshold to generate a binary output image. In one embodiment, image differencing is used to filter images taken from the restaurant parking lot entrance and exit, and the drive-thru lane, prior to applying algorithms that detect vehicles. An initial image (i.e., a background image 102) is captured from this field of view, which is known to be devoid of objects—in this case, cars. A large object such as a car should create a large change in many pixels in subsequent images—making it fairly straightforward to infer the presence of a car by applying simple detection algorithms to the differenced image.

Image differencing calculates, on a pixel-by-pixel basis, the difference (block 100) in pixel intensity between two images: the "current" image 104, which is presumed to contain an object of interest; and the "background" or reference image 102. The intuition of the method is that if the background can be subtracted out of an image, only the object of interest will remain. A limitation of the method may lie in the selection of a reference image that closely correlates to the background contained in the current image. The intuition here is that background pixel intensities are constantly changing as lighting conditions change. In order to properly "subtract out" the background of the current image, a reference image whose pixel intensities are very close to the background in the current image is preferably required.

If the reference image is not closely correlated to the background of the current image, then when the reference image is subtracted from the "current" image, the difference between the pixel intensifies of the "reference background" and the "current background" may remain. These background differences are unwanted "background noise", which can obscure the object of interest, making it more difficult for subsequent algorithms to detect the object of interest.

Image-Wide Threshold—A Single Car Detector

Certain camera images may have a field of view that is likely to contain only a single vehicle at a time. The entrance and exit camera may be set up to have such a view. Under such conditions, a simple detection algorithm such as an image-wide difference threshold (block 106) may be used to detect the presence of an object large enough to be a car. The image-wide difference threshold method calculates an image-wide value of the differenced image (at block 100) (for example, by summing the absolute value of the image pixels) in order to measure the magnitude of the change between the background image and the current image. If the image-wide intensity difference is large enough (when compared with a predetermined threshold), then it is determined that a fairly large object has moved into the view. The position of the object of interest may be estimated by calculating the center of mass of the object in the differenced image (block 108).

In this method, the differenced image is analyzed to determine whether or not a car is present. The analysis may include the following steps: (a) Every pixel in the difference image may be compared to a threshold value to determine whether the pixel should be labeled as "occluded." The result is an "occlusion map", containing boolean values (true or false) at each pixel position, indicating whether the corresponding pixel is labeled occluded or not. (b) Each row in the occlusion map may be then analyzed by counting the number of occluded pixels in the row. If this count exceeds a threshold percentage relative to the total number pixels in the row, the row is labeled as "occluded". (c) If the number of occluded rows in the difference image exceeds a threshold percentage relative to the total number of rows in the image, the image is determined to contain an object large enough to represent a car.

Direction or Motion Detection

The differenced image may contain a "blob" of pixels (i.e., the mass of the object of interest) corresponding to the object of interest (e.g., a car), probably surrounded by spurious pixels (noise). The center of these pixels can be calculated by averaging their row and column values (block 108). Comparing successive images, given a sufficiently fast frame rate, may provide a simple method of determining the direction of the vehicle—which may be useful in determining whether the vehicle is entering or exiting the restaurant's parking lot (block 110).

The motion detection process references the intermediate results of the processing step $P_1$ (discussed hereinabove) for two successive frames containing a car. Let $F_{n-1}$ and $F_n$ denote the first and second of such two frames, respectively. In a preferred embodiment, the entrance camera is oriented such that arriving cars move through the image from top to bottom. Image rows are numbered increasing from top to bottom of the image. The motion or direction detection process considers the top-most and bottom-most occluded rows as determined during $P_1$. Let $RT_i$ denote the topmost occluded row of frame $F_i$, while $RB_i$ denote the bottom-most occluded row of frame $F_i$. There are four classification determinations: (1) If $RT_{n-1}<RT_n$ AND $RB_{n-1}<RB_n$, the car's motion between frames $F_{n-1}$ and $F_n$ is classified as "A" for arrival. (2) If $RT_{n-1}>RT_n$ AND $RB_{n-1}>RB_n$, the car's motion between frames $F_{n-1}$ and $F_n$ is classified as "D" for departure. (3) If $RT_{n-1}=RT_n$ AND $RB_{n-1}=RB_n$, the car's motion between frames $F_{n-1}$ and $F_n$ is classified as "S" for stationary. (4) In all other cases, the car's motion between frames $F_{n-1}$ and $F_n$ is classified as "I" for indeterminate.

Signaling a Detection Event

An "event sequence" may be defined as a series of consecutive frames which contain a car. Thus, an event sequence begins when a frame containing no car is followed by a frame that does contain a car, similarly, the event sequence ends when a frame containing a car is followed by a frame not containing a car. All frames in between these two endpoints are considered part of the event sequence. Every consecutive pair of frames in the event sequence is analyzed by processing step $P_2$ (discussed hereinabove) to determine its direction of motion, and the resulting votes are summed for the entire event sequence. At the end of the event sequence, the motion indicator with the highest number of votes may be used to classify the entire event sequence as "A", "D", "S" or "I", and a software event containing this outcome may be generated and broadcast for consumption by other software modules. The vote counters are then reset to zero for the next event sequence.

It is important to note that an image-wide thresholding algorithm may provide evidence that a certain metric of the object matches a known metric of the object class. In other words, this algorithm may say that the object is "large enough to be a car," but may not positively identify the object as a car. This algorithm can be "fooled" into generating a false positive by any other object that is also "large enough to be a car". For example, if a bus unloads a large group of patrons who happened to walk through the field of view, they could be falsely identified as a vehicle because they collectively create enough change in the image to register as "large enough to be a car".

In addition, the image-wide thresholding method may not determine the number of cars, i.e., how many cars are in the field of view. This may cause several problems. For example, two cars may pass through the field of view in opposite directions at roughly the same time. In that event, the thresholding detector will indicate when something is in the field of view that's "large enough to be a car", but will not indicate that two cars are present. Calculations to indicate the direction of the car may also be in error, as the center of the "blobs" will correspond to the average center of the two cars.

Improved Single and Multi Car Detection—Region Segmentation

Region segmentation algorithms can be used to overcome some of the limitations of image-wide thresholding by determining whether the "blob" of pixels in the image represent a collected, compact mass. Spurious noise, and/or a collection of smaller objects (such as a group of people), can fool the image-wide threshold by triggering as many pixels as a car. Region segmentation techniques test whether those pixels are actually connected into a single blob—further evidence that the object in the field of view is a car. In addition, region segmentation identifies spurious events such as multiple cars passing through the field of view together, even when they are passing in opposite directions.

In one embodiment, images taken from several fields of view may contain multiple cars. This is especially important in tracking a drive-thru lane, where the objective is to maintain an accurate count of the number of vehicles in the lane. Differenced images (at block 100) of these views may contain groups of pixels that correspond to the multiple vehicles. Therefore, it may be desirable to segment or group the pixels that comprise a single blob, in order that the number of distinct blobs in the image might be counted. Prior to segmenting, it may be desirable to perform preprocessing of the regions containing images by growing each "blob" for corresponding images by 1–2 pixels in order to improve the Connected Component Extraction algorithm's performance (block 112), as discussed below.

The "Connected Component Extraction" algorithm (block 114) is a well-known computer vision algorithm for labeling sets of pixels that comprise a single blob. The algorithm operates by marking pixels that arm "connected" (share a common edge and/or touch corners) with a common label, thereby grouping the connected pixels into identified regions. The output of the algorithm is a list of regions. Each pixel in the image may be marked with exactly one region label, to identify the region to which it belongs. The number of vehicles in an image corresponds to the number of region labels. The location and the direction of each vehicle's motion can now be calculated as in the single car example (blocks 108, 110).

A principal limitation of the region segmentation method arises from the notion of "connection". The algorithm, as discussed before, operates by scanning the image on a pixel-by-pixel basis and labeling connected pixels with the same region label. In practice, image noise can significantly impact the performance of the algorithm by "disconnecting" regions that are actually connected in physical reality. Region growing (mentioned before with reference to block 112) is one method of improving the performance of region segmentation algorithms. Region growing may be most easily applied to binary images by scanning each pixel of the binary image. If the current pixel is occupied, then its neighbors are checked—any unoccupied neighbor is set to an occupied status in the output image. The name "region growing" comes from the observation that the "blob" in the output image generally grows by one pixel around its perimeter.

Regions labeling methods may be improved by applying a threshold (block 116) to the output regions to determine whether the region is (a) too small to correspond to a car, or (b) large enough to correspond to more than one car. Regions that are too small may be eliminated from further consideration. Regions that are large enough to correspond to more than one car can be further processed, or simply noted to correspond to N cars, where N is the ratio of the number of pixels in the region to the number of pixels corresponding to an average car. A ceiling or floor function may be applied to N to generate an integer output.

The accuracy of the 2-D image processing algorithms may be improved by addressing changes in background lighting, which affect the quality of differenced images; and noise in differenced images, which affects the quality of region segmentation algorithms. Background image drift can be managed by updating the reference image to correlate more closely with the "background" contained in the current image. The reference image may be updated on an image-wide, or pixel-by-pixel basis. Careful management of the reference image helps to reduce or eliminate spurious "background noise" that inhibits the performance of subsequent image processing techniques. A straightforward, image-wide method is to regularly select the most recent background image as the new reference image. In this method, the "current" image is differenced from the reference image. If the differenced image is not found to contain an object, then this current image becomes the new reference image. A second, more computationally complex method is to maintain an average pixel value, for each pixel in the image, across the last several images. This method essentially constructs an artificial reference image, rather than selecting a new reference image. Careful selection of the averaging window enables the filter to react to abrupt changes in the background, without creating background image oscillation.

Feature Detection Approach to 2D Image Processing

As discussed above, one approach to 2D image processing is to focus on "region" or "blob" detection—i.e., to look for a group of pixels that is large enough to be a car. An alternative image processing approach may be to look for a set of "features" in the image that may provide evidence of the existence of an automobile or person in the image. Such "feature detection" techniques may operate by matching features in the image to one or more feature models. In the case of an automobile, for example, the "features" might be windshields, wheels, headlights, or other detectable features.

A feature detection method may benefit significantly from the use of "region" or "blob" detection methods as a pre-processing filter. Intuitively, feature detection methods "search" through an image, looking for a correlation with the feature model. The "region" or "blob" detection algorithms can significantly reduce the number of images to be searched—if there isn't anything large enough to be an automobile, it may not be desirable to search that particular image for headlights. If region methods do find something large enough to be an automobile, then the feature search can be focused on the region of interest—significantly improving the computation efficiency of the feature search method. When used in conjunction with region or blob methods, a feature detector may essentially test the hypothesis that the "object large enough to be a car" actually is a car by searching for corroborating evidence—i.e., the existence of headlights, windshields and wheels.

Feature detection methods may also be used to differentiate between scenarios that may be ambiguous to region detection methods. For example, a region-based method may not be able to differentiate between a pickup truck pulling a trailer through the drive-thru and two cams following each other through the drive-thru. Both scenes may contain blobs of roughly the same size and distance apart; however, a feature detector may be able to confirm that, in the pickup and trailer scene (for example), the first blob is a vehicle, while the second is not.

Several key "features" may help to positively identify that an object is an automobile. The location and size of these features may also help to classify the vehicle's type—i.e., for example, car vs. minivan vs. truck vs. bus. Some of the features may include: (1) Width—Most vehicles (i.e., vehicles that are more probable to visit a quick-service restaurant) may be considered to have the same general width. (2) Length—Vehicle lengths may vary, but may be considered generally to be between 15 and 22 feel (3) Glass—Windshields and windows may be found at 3–4 feet above the ground, and generally rectangular in form, and generally wrapped around the vehicle. (4) Wheels—Wheels and tires may be safely assumed to be round with wheel diameters of 13–18 inches.

Pixels corresponding to key features may be extracted from either an original image or a differenced image. For performance improvement, as mentioned before, the image differencing technique may be used to identify images likely to contain a vehicle—e.g., there is "something large enough to be a car" in the image. In the discussion under this section, the term "original image" means the image that was originally differenced and found to contain an object. The term "differenced image" means the corresponding post-differencing output image.

There may be several edge operators commonly available—the simplest is probably the Sobel operator and the most complex is probably the Canny operator. Edge operators may be chosen by the designer of the buffer manager 20 for a specific restaurant establishment by considering particular performance requirements of the desired application at the restaurant. The output of an edge detector may be an image of edge pixels. These edge pixels may then be examined to determine whether they likely correspond to any particular vehicle features. In this section, it is assumed that an edge operator has been run over both the original and the differenced images.

Running an edge operator over the differenced image may enable the measurement of the basic width and length of the vehicle. This information may help to establish whether the blob (in the differenced image) has the basic dimensions appropriate to a vehicle. The information may further help to establish whether multiple vehicles are present in the image. This technique may be equivalent to measuring the size of the blob, and identifying individual blobs using previously described region-based techniques.

Edge pixels may be grouped into geometric elements, such as lines and circles, using standard 2D image processing techniques such as, for example, the Hough Transform. The Hough Transform works by considering the possible set of lines to which each edge pixel might belong. A matrix of the parameters of all possible lines, called the "accumulator", may be formed. Each edge pixel may then add one vote to the accumulator elements corresponding to lines of which it could be a member. Naturally, the accumulator elements corresponding to lines in the image will receive many more votes—enabling their identification. The Hough Transform may be generalized to other geometric shapes. For example, circle detection may be achieved by using an accumulator that references a circle's parameters (x,y,r) where x and y denote the center of the circle and r is the circle's radius. Techniques other than the Hough Transform may also be used either alone or in combination with other methods for feature matching.

Queuing Models

In one embodiment, the buffer manager 20 design is based upon classical approaches to uncertainty, queuing theory, parameter estimation, and 2D image processing (computer vision). Uncertainty is modeled by separating the uncertainty of buffer management into two orthogonal uncertainty classes and then addressing each class separately. These two uncertainty classes are: (i) Temporal Uncertainty—The uncertainty of when the consumer order will be placed; and (ii) Product Uncertainty—The uncertainty of what food product the consumer will order.

In one embodiment, temporal uncertainty (estimation of which is discussed in more detail hereinbelow with reference to block 82) may be reduced through direct measurements (i.e., the output generated at block 72 in FIG. 4) of leading demand indicators. A quick-service restaurant's best leading demand indicator is the arrival of a customer on the restaurant's property. Future product orders are highly correlated to customer arrival, with a lag time that is a function of the number of customers already on the property.

To estimate product uncertainty (discussed in more detail later hereinbelow with reference to block 88), in one embodiment, each consumer order is modeled as an independent random event. Each product then has a certain probability, p, of being selected by a consumer during an order. The number of products expected to be consumed by N patrons can be estimated as the summation of the outcomes of N random events.

Temporal and product uncertainty estimates may be combined to determine the expected amount of product to be ordered within certain windows of time. Conceptually, a future time can be assigned to each independent ordering event, based on various measurements of that particular consumer's progress through the restaurant property. The estimate of when a consumer will place an order allows the calculation of the expected demand for food products as a function of time.

In one embodiment, "Queue Theoretic Modeling" techniques are employed to better estimate when an arriving customer will place an order (i.e., estimating order times). A queue theoretic model assumes that patrons arrive at a service location, where they form into a queue and are serviced-according to some service rule. As an example, in a typical drive-thru restaurant queue patron vehicles line up in a single, serial queue, where they are serviced according to a "First In, First Serve" rule. The selection of a queuing model may be a trade-off between demand prediction accuracy and computational complexity. The designer of a buffer manager for a specific restaurant may need to compare the queuing behavior of that restaurant against a series of increasingly complex models to determine which model provides sufficient accuracy, given its computational cost, for that particular application. It may be critical to improve the accuracy of the temporal component of the prediction by more accurately modeling the queuing behavior of customers. The following is a series of queuing models listed in order of increasing computational complexity.

(1) Zero Queue Model (block 77)—The zero queue model may assume that each patron arrives at the restaurant and is serviced in constant service time, T. Note that, generally, service times may be replaced by a service time distribution with an average service time. Such technique may be useful in practice, as it can be used to establish "confidence bounds" on minimum and maximum expected service times. The zero queue model essentially assumes that service can be provided in an infinitely parallel manner—in other words, the $i^{th}$ patron's service time is not a function of the number of other patrons that are in the queue. Thus, conceptually, the zero queue model treats the restaurant property as a black box. If one were to track only when cars entered and exited the restaurant property, and calculate the average time that a car spends on the property, then one would arrive at the average service time for the zero queue model. The model simply ignores the specifics of how customers are served within the restaurant properly, forming only a gross estimate of how long such service takes.

(2) Single Queue Model (block 78)—The single queue model assumes that each patron arrives at the restaurant, enters a single queue with a constant or average service time T. Conceptually, this model may be equivalent to a restaurant that provides only drive-thru service every vehicle enters the same drive-thru line, where the first person in line is serviced.

(3) Single Queue, Multiple Station Model (block 79)—The single queue model can be expanded to multiple service stations, each of which has a service time T. This model may be considered a conceptual expansion of the drive-thru-only restaurant, where service is provided at multiple stations. For example, drive-thru patrons often stop first at an order station, then proceed to a payment window, then proceed to a pick-up window.

(4) Multi Queue Model (block 80)—The multiple queue restaurant service models are multiple, single queue models in parallel. Conceptually, patrons enter the restaurant property and then join one of several possible single queues. The most common example is the choice between joining the drive-thru lane or parking the car and joining the counter queue. Some restaurants also provide parallel counter service, where patrons can join one of several parallel counter queues.

Estimating Ordering Times—Queue Simulation

The buffer manager 20 may combine the visual detection of arriving consumers with a simulation of the restaurant's queue (using one or more of the queuing models 77–80) to predict when each consumer will arrive at an order panel (blocks 82, 83).

A queue simulator may maintain a list of the objects detected by the vision system (i.e., the image processing system 74 operating on the data received from the sensing system 73). Each object in the list may have an associated clock, which maintains the time since that object was first detected. Each queue simulator, regardless of its complexity, may create a new object and add it to the list when the vision system detects a new vehicle entering the restaurant property at the entrance of the restaurant. The queue simulator may classify the state (or status) of each object. There are three possible states: transit-to-queue; in-queue; and served. The first state, "transit-to-queue", denotes an object that is in transit to a queue, but has not yet reached the queue. The second state, "in-queue" indicates that the object has arrived in a queue and is either waiting to be served, or, if it is the first object in the queue, is currently being served. The third state, "served", indicates that the object has been served.

Upon detecting a new object, the buffer manager 20 may add the new object to the object list and start the object's clock. When a pre-set transit-time has elapsed (simulating the amount of time that it takes for a detected object to enter the queue), the object's status may be changed to "in-queue". Once in the queue, the new object advances toward the head of the queue, moving closer each time the object at the head of the queue is served. Once the new object reaches the head of the queue, a new clock may be started. Once a pre-set "service time" elapses, the new object's status is changed to "served".

In the case where an object enters a serial queue with more than one service station, additional states may be added to represent each stage of the serial queue. For example, a three-station queue may require adding states to represent "first-stage-queue", "second-stage-queue", and "third-stage-queue". Service clocks may also be required for each stage. It is observed that when implementing a multi-stage serial queue, one must take care to note the maximum number of objects that each segment of the queue will be allowed to contain. If an object's service is completed at the first service station, it may pass on to the second queue only if there is room. This requires modifying the test for changing state to "if (service-time-has elapsed) && (room-in-the-next-queue)". Parallel queues may be modeled as independent implementations. However, there may still be a need to decide which of the parallel queues is entered by the object.

Implementation of a Zero Queue Simulator

This simulator models the restaurant as an infinite number of parallel service stations. When an object is detected, a certain amount of time (transit-time) is assumed to elapse before the object reaches one of these service stations. Once at a service station, a certain amount of time (service-time) is assumed to elapse to service the object. A zero-queue simulator may operate under the following state-change rules: (1) When a new object is added to the list: (a) Mark its status "transit-to-queue"; (b) Start the clock; (2) When T=transit-time has elapsed: (a) Change the object's state to "in-queue"; (b) Restart the clock; (3) When T=service-time has elapsed: (a) Change the object's state to "served". A zero-queue simulator may require the estimation of the "transit-to-queue" time and the "service-time" parameters. In practice, however, the division between the "in-transit" and "in-queue" states is arbitrary and can be ignored. Thus, a single service time can be estimated and used to model the average time that elapses from the entrance of a vehicle onto the restaurant property until that same car leaves.

Implementation of a Single Queue Simulator

This simulation models the restaurant as a single drive-thru. Every object detected at the entrance may be assumed to enter a single queue, which advances as the first object in that queue is served. This simulation models single point of service in the queue. A single-queue simulator may operate under the following state-change rules: (1) When a new object is added to the list: (a) Mark its status "transit-to-queue"; (b) Start the clock; (2) When T=transit-time has elapsed: (a) Add the object to the end of a serial queue; (b) Change the object's state to "in-queue"; (3) For the first object in the serial queue: (a) Restart the clock; (b) When T=service-time has elapsed: (i) Change the object's state to "served"; (ii) Remove the object from the queue; (iii) Advance each object in the queue one position. A single-queue simulator may require the estimation of a "transit-to-queue" time and a "service time" parameters for the single service station. An estimate of the "transit-to-queue" time can be formed by measuring the average amount of time required for a car to transit from the entrance detector to the end of the queue. The "service time" can be estimated by measuring the average amount of time elapsed from the moment that a car pulls up to the order panel until the time that it drives away from the present (delivery) window. These service times may or may not be available from the restaurant's ordering system.

Implementation of a Single Queue, Multiple Station Simulator

A single queue, multiple station model expands upon the single queue model by adding additional service points in the queue. The model is essentially a single drive-thru restaurant where service is divided into multiple stations, such as order, payment, and presentation. A single queue, multiple station simulator may operate under the following state-change rules: (1) When a new object is added to the list: (a) Mark its status "transit-to-queue"; (b) Start the clock; (2) When T=transit-time has elapsed: (a) Add the object to the end of a serial queue; (b) Change the object's state to "in-queue"; (3) For the first object in the serial queue: (a) Restart the clock; (b) When T=service-time has elapsed: (i) If there is a next queue and room in the next queue: (A) Change the object's state to "next-queue"; (B) Move the object to the end of the "next-queue"; (C) Advance each object in the queue one position; (ii) If this was the last queue, then: (A) Change the object's state to "served"; (B) Remove the object from the queue; (C) Advance each object in the queue one position. A single queue, multiple station simulator may require the same transit-time estimator as the single queue simulator. It differs from the previous model in that it requires the estimation of multiple service times, one for each station in the queue. The estimation methods am essentially the same as in the single queue model.

Implementation of a Multi Queue Simulator

As discussed before, a multiple queue model is treated as multiple, single queue models in parallel. Hence, a multi queue simulator may be implemented as multiple single queue simulators discussed hereinabove. Hence, no additional discussion of a multi queue simulator is provided herein.

Adding Drive-Thru Vehicle Detection

As described hereinbefore, 2-D image processing technique may be used to count multiple vehicles in a single image. This technique can be applied to a field of view that contains the drive-thru lane and used to count the number of vehicles in the drive-thru. Such a technique may also enable the system to reason about expected counter traffic.

A direct measurement of the drive-thru queue can replace the need for a drive-thru queue simulator to model traffic flow through the drive-thru lane—assuming that the implementation of the vision processing system provides sufficiently accurate data. In one embodiment, the use of a drive-thru measurement system is envisioned primarily as a means of augmenting and not replacing the entrance detector. The use of a drive-thru measurement system alone may not provide the buffer manager 20 with an accurate estimate of the total demand that the restaurant expects to see in the next few minutes, as it may not have any means of detecting the number of vehicles that have entered the property, but have not entered the drive-thru line.

In certain applications, where the drive-thru comprises a very large percentage of the restaurant's business, the solo use of a drive-thru measurement system may prove sufficiently accurate. For these applications, a "safety factor" may be introduced to account for the undetected entrance traffic. Such implementations should be cautiously tested to ensure that they truly provide sufficient buffer management accuracy.

A direct measurement of the drive-thru queue, together with an accurate count of the number of vehicles that have recently entered the restaurant's property, may make it possible to determine the number of vehicles that have been parked. Patrons of parked vehicles usually become counter traffic, enabling the system to form an estimate of the arrival of new counter traffic that is substantially proportional to the number of newly parked cars. A counter queue may be modeled simply as a single serial queue or a set of parallel queues, as appropriate to the actual ordering configuration of the restaurant front counter area 32 (FIG. 3).

Implementation of a Simulator with Drive-Thru Visual Detection

Drive-thru visual detection may significantly reduce the uncertainty associated with the internal flow of consumer traffic. The actual state of the drive-thru can be measured at a high enough rate to virtually eliminate uncertainty about the number of vehicles in the drive-thru and the average service lime for the queue. The queue simulator may be split into a drive-thru model and a counter model. Direct visual monitoring of the drive-thru lane enables the employment of the simple, single queue model without the need for multiple service stations, as discussed below. The counter queue may be modeled as a single queue, or a set of parallel queues, depending upon the actual configuration of the counter service area as noted before.

Direct visual measurements may enable the drive-thru simulator to operate under some simple state change rules: (1) For each object detected at the entrance: (a) Create a new object; (b) Assign that object the status "in-transit"; (c) If an object enters the tail of the drive thru queue within some "maximum-transit-time" then: (i) Change the object's status to "drive-thru-queue"; (ii) Add the object to the drive-thru queue list; (iii) Assign the object a position number—e.g., $i^{th}$ object in the queue; (d) Otherwise, assume that the object has parked: (i) Change the object's status to "parked"; (ii) Add N persons to the counter traffic queue; (2) For each object in the drive-thru queue: (a) Visually monitor the queue; (b) For the first object in the queue: (i) Start a clock when it becomes the first object; (c) When the first object in the queue moves past the ordering panel: (i) Stop the first object's clock; (A) Report the elapsed time to the average service time estimator, (ii) Update each object's position in the queue; (iii) Change the first object's status to "served".

A counter queue simulator may be implemented as either a single service queue, or multiple parallel service queues, depending upon the physical service layout in that particular restaurant. It is observed that many restaurants force their patrons to queue-up in a single line, using railings or other barriers to denote the queue path. Other restaurants may have multiple ordering stations, allowing patrons to line up behind 2–3 different queues. A counter queue simulator's state change rules may be identical to those of a single queue. Where parallel queues are used, the simulator may assign each incoming patron to one of the parallel queues. In one embodiment, incidences of queue shifting are ignored.

The employment of visual monitoring of the drive-thru lane may significantly reduce the uncertainty of the queue simulation by reducing the amount of traffic whose progress through the restaurant service process is simulated. With drive-thru traffic comprising 40%–60% of an average restaurant's daily business, this may result in significant reduction in prediction error. However, one must realize that the underlying assumption in employing this method is that visual monitoring is more accurate than the drive-thru simulation. Therefore, one must ensure that this is indeed the case. Further, an implicit assumption is made in visual monitoring that all traffic that does not enter the drive thru must have parked and become counter traffic. This may be unlikely to be true at least some traffic may pass through, may be employees, or may not become counter traffic for some other reason. This assumption may be softened by introducing a proportionality constant- and, in fact, this implicitly happens, as such a constant is "folded in" to the consumer to parked car ratio previously discussed.

Extension to Enable Detection of Parked Cars

The accuracy of the buffer manager 20 may be further improved by taking direct visual measurements of a restaurant's parking area in order to determine exactly how many cars have parked. Simple extensions to the image processing algorithms previously described enable the system to determine whether a vehicle has parked. Parked cars occupy regions of the parking lot that are known a priori and cars stay there for a fairly long period of time. The detection of parked cars may be accomplished using substantially the same 2-D image processing methods previously described for tracking a drive-thru lane. Extensions to the image processing methods may be required to calculate the positions of the identified regions and determine whether they presently occupy a "parking space". The positions of the identified regions can be reported either in the image space (column, row), or transformed into a coordinate system in the restaurant's frame of reference. In a preferred embodiment, the camera used to localize the object remains fixed in the restaurant's frame of reference—therefore transformation into a second coordinate system may not be necessary so long as the "parking spaces" can be transformed into the image space.

Occlusion may be a particular concern because the buffer manager 20 may need to distinguish between the occupancy of a parking space with occlusion of a parking space. There are two general approaches to distinguishing between occupancy and occlusion. The first method is to add a second sensor whose field of view removes the ambiguity—i.e. the second sensor can see the object from another point of view, enabling a 3D localization. The second method is to selectively place the original sensor such that occlusions are minimized, and use a set of heuristics to "confirm" that the object is occupying the space. Such heuristics may include measuring the median axes of the object to see if the long axis aligns with the parking space.

Visual detection of parked cars may improve the accuracy of the estimates of the counter queue arrivals by more accurately measuring the time at which a car parks. This method may still require the assumption that a certain number of consumers enters the counter queue per car, thus no improvement in the actual consumer count may be made. As discussed before with reference to the state change rules for a single queue model, the single queue simulator created an object upon its detection at the entrance, and then assumed that the object spent some amount of time "in-transit". The application of this queuing method to the counter queue may require estimating the "in-transit" time to include the time to park the car, the time to get out of the vehicle, the time to walk across the parking lot, and the time to enter a queue. Visual detection of parked cars may improve the accuracy of the simulator by actually measuring the first part of the "in-transit" time—the time to park the car.

Detecting People

The accuracy of a queue simulator may benefit from the visual detection of people, either as they exit their parked cars or as they enter the restaurant. In one embodiment, the same cameras that provide images of the parking lot, also capture images of patrons as they exit their vehicles. Additional cameras can be placed such that they capture views of the entrance doors at the restaurant. The addition of entrance door cameras may provide higher accuracy patron count, as the field of view can be narrowed such that a person subsumes a larger number of pixels than is possible with a parking lot camera. The detection of a person may be accomplished in substantially the same manner as the detection of vehicles in the drive-thru—using image differencing, followed by region segmentation (as discussed hereinbefore with reference to FIG. 7).

The detection method may be applied to images of a parking lot in the case where the detection of persons exiting their vehicles is desired. The structure of the problem enables the detector to narrow its search for new, emerging blobs that may appear to the right and left of the long axis of the vehicle as the vehicle's doors open. This change in the shape of the vehicle is the first evidence that a person will most probably emerge from the vehicle. Detection of an opening door may be performed by comparing iterative "blobs" and looking for the emergence of additional pixels in the appropriate place. Following the detection of the opening of the door, the buffer manager 20 may track that side of the vehicle (i.e., the side of the vehicle containing the opened door), toward the rear of the vehicle, for small blobs that may emerge from the parking zone, cross the parking lot, and head toward an entrance of the restaurant. Following region segmentation, the height and aspect ratio of blobs detected in the appropriate sections of the image may be compared to determine if they are the correct height and shape for a human. These metrics may further provide evidence as to whether the blob may be an adult or a child.

The same method may also be employed to use a camera specifically aligned with the entrance doorway. The addition of a sensor that indicates when the door has been opened (such as a broken circuit) can provide separate evidence that patron(s) may be entering. It is observed that the application of the method discussed hereinabove to parking lot images versus doorway entrance images may be a tradeoff between look-ahead and accuracy. The detection and count of patrons in the parking lot may provide the restaurant kitchen with more warning that consumers are approaching. The detection and count of patrons at the entrance doorway may be more accurate—especially if one attempts to classify patrons into classes such as "adult" versus "child"—simply because a closer image will provide the vision algorithms with more pixels to work with. The visual detection of people entering a restaurant (whether detected exiting a car, or entering the doorway) may provide an explicit count for the counter queue. This explicit count may be more accurate than an estimate based solely on the number of cars that park in the restaurant's parking lot.

Estimating Impending Production Demand

After modeling temporal uncertainty (at block 82 in FIG. 4) to determine the timing of consumer orders, the buffer manager 20 may next estimate impending production demand (block 84) using a probabilistic model to calculate the expected number of food products and food product components the restaurant's kitchen should prepare in order to meet the impending demand generated by arriving customers. The probabilistic model may take as input N, the number of patrons expected to arrive at an ordering panel within the time period T (as determined at block 82). Alternately, the probabilistic model may take as input N(t)—the time-dependent version of the time-invariant input N—indicating the number of patrons expected to arrive at the ordering panel at time "t" (i.e., a particular instant of time as distinguished from an interval of time given by "T").

The buffer manager 20 may use queue simulation to make a series of production decisions in real time. Some typical questions that a human restaurant manager may periodically consider in order to manage buffer levels are: (1) How many bins of components should the kitchen crew generally keep in the buffer? (2) How much longer is the current bin level likely to last? (3) When will the kitchen likely need to start cooking more food product components? (4) Can I confidently order any completed products to be made ahead of time?

The buffer manager 20 may estimate impending production demand by estimating desired nominal component buffer level (block 85), estimating remaining time per bin (block 86), and estimating optimal preparation times (block 87) as discussed below.

Estimating Desired Nominal Component Buffer Level (Block 85)

A "nominal" buffer level may be defined as the number of bins of food components (e.g., burger patties and buns for a completed burger product) that a human restaurant manager may order the kitchen staff to maintain. In a restaurant with a grill, a grill cook can easily regulate the buffer at a certain number of bins or patties. This method of buffer management is traditionally one of the most common because it is so easy for the crew to accurately carry out. A human manager can simply tell the grill cook to maintain 34 bins of meat throughout lunch and feel confident that that level of food product will be available. In one embodiment, the buffer manager 20 according to the present invention determines the nominal buffer level using a patty count instead of a bin count.

The buffer manager 20 according to the present invention improves upon this practice by electronically calculating a "nominal" buffer level that is proportional to the actual number of patrons on the restaurant's property. The buffer manager 20 attempts to change the "nominal" buffer level such that both over and under production are avoided. Nominal component buffer levels may be calculated based on the number of patrons, N, on the restaurant property who have not yet placed an order. As described hereinbefore, several vision-based methods of estimating the number of patrons on the restaurant's property include counting cam at the rstaurant's entrance, counting cars at the drive-thru, counting parked cars, and counting restaurant patrons. From these several methods, an estimate of N may be formed. The nominal buffer level for each food product component is proportional to N. The proportionality constant for each food product component may be termed the "expected value"—referring to the expected number of food product components that each patron is expected to consume, on average. Estimation of the "expected value" may be considered a part of the product uncertainty modeling (discussed later hereinbelow with reference to block 88 in FIG. 4).

Estimation of desired nominal component buffer level may bound production by the total number of unplaced orders on the restaurant property. Where historical data methods may actually call for production during periods where there are absolutely no potential consumers on the property, the estimation performed by the buffer manager 20 would call for a bin level of zero. Where historical data methods may call for low production during a period when 20 cars show up, the buffer manager 20 would instruct the kitchen crew to drive production higher, in proportion to the newly arrived demand. Thus, this method of estimating desired nominal component buffer level according to the present invention may drive production in proportion to current demand. Subsequent methods may work to improve the convergence of this method's demand-curve following performance.

The method that estimates the nominal component buffer level may be a strict proportional controller that commands a buffer level proportional to the total number of unplaced orders on the restaurant property. This method may not take time into account. Thus, product freshness may not be represented in the calculation of production commands, nor may the minimum time requirements of production be considered. These limitations may cause the buffer manager 20 to order production that produces product unnecessarily soon, or it may allow bin levels or patty counts to drop so low that the kitchen staff could not adequately prepare product fast enough to serve the next arriving set of consumers. In other words, the above-described method of estimating nominal component buffer level may not consider the impact on freshness or the need for safety margins.

Estimating Remaining Time Per Bin (Block 86)

Each bin of food product components may last a certain amount of time, dependent upon the rate of arrival of new consumers. Thus, it may be desirable to estimate the remaining time for a bin of food product components so as to decide when to begin cooking another bin of food product components. If there isn't enough demand to consume the remaining bins, then the restaurant shouldn't prepare additional food product. If theme is enough demand to consume the remaining bins, then the kitchen may wish to wait to prepare the new food product components "just in time" in order to maximize its freshness.

When an estimate of the number of patties (an example of a food product component) remaining in the buffer is available (using the method described hereinbelow with reference to block 88 in FIG. 4), the remaining time per bin may be estimated as follows: (1) Calculate the number of patrons, P that can be served, given the number of patties currently contained in a bin. (2) Obtain an estimate of the number of patrons on the property P*. (3) If P<P*, then no additional patties are required: (a) Remaining time per bin is not defined. (4) If P>P*, then: (a) Using the relevant queue simulator model, walk backwards through the queue to the Pth patron; (b) Record the estimated time of arrival (ETA) for the Pth patron; (c) The ETA of the Pth patron is the estimated remaining time for the bin.

The method described hereinabove may be extended to multiple bins. Most buffer systems contain multiple warming bins, therefore it is desirable to extend the method to calculate the remaining time per bin for each bin. The bins are assumed to be labeled i=(1, 2, . . . N) in order of their production—bin 1 was made first, followed by bin 2, etc., through bin N. The extended method can be given as: (1) Calculate the total number of patrons $P_i$ that can be served, given the number of patties in the $i^{th}$ bin; (2) Obtain an estimate of the total number of patrons on the property. P*; (3) For each bin: (a) If sum $[P_0 \ldots P_d]$<P*, then (i) The remaining bin time for the $i^{th}$ bin is undefined; (b) If sum$[P_0 \ldots P_i]$>P*, then (i) Using the relevant queue simulator model, walk backward through the queue to the $P_i^{th}$ patron; (ii) Record the estimated time of arrival of the $P_i^{th}$ patron; (iii) The ETA of the $P_i^{th}$ patron is the estimated remaining time for the $i^{th}$ bin.

Estimating Optimal Preparation Times (Block 87)

The previously described method of calculating the "nominal" bin levels (at block 85) may not explicitly calculate when another bin of food product components should be prepared. The method at block 85 may be used to regulate buffer levels by displaying the nominal bin level to the kitchen crew and relying upon them to judge when to prepare a product. Alternatively, the buffer manager 20 may estimate optimal preparation limes for the kitchen crew by continually reviewing the component reserve held in a buffer with the current demand detected on the restaurant's property. Moreover, the queue simulators (discussed hereinbefore) may provide a good estimate of the rate at which that demand will place future orders. This information may collectively enable the buffer manager 20 to calculate optimal preparation times, given an estimate of the production time required to prepare another bin of food product.

A method for determining the "nominal" bin levels—or the total number of bins required to meet the demand currently on the restaurant property has been described hereinbefore with reference to block 85 in FIG. 4. The following is a method to calculate the production time for each bin. First, the buffer manager 20 may subtract the number of bins currently available in the kitchen service cabinet from the total number of bins required. The difference may be called the "total bin requirement". Next, the buffer manager 20 may determine when the cabinet will likely run out of its current supply—the "buffer horizon". A method of determining the estimated remaining time per bin has been described hereinbefore with reference to block 86 in FIG. 4. Next, the buffer manager 20 may determine when the first consumer will reach an ordering panel after the buffer runs out of its current supply. The time at which this would occur may be called the "downtime horizon". Finally, the buffer manager 20 may estimate how long the kitchen crew may take to produce a bin once they are ordered to do so—the "production horizon". A method of forming such an estimate is described later hereinbelow.

The optimal production time ($T_i$) for the $i^{th}$ bin may be calculated as follows: (1) For each bin to be produced [1, 2, 3 . . . total-bin-requirement]: (a) Simulate adding (i−1) bins to the buffer, (b) Calculate the downtime-horizon for the simulated buffer, (c) Ti=downtime-horizon−production-horizon. Optimally, a restaurant should produce a new bin at the last possible moment, such that it is ready for consumption just when it is needed. Such "just in time" production may minimize the component's bin time, providing for hotter, fresher product. However, in practice, the restaurant may choose to operate with a safety margin, keeping a few extra patties in the bin or maintain a predetermined minimum number of patties in the bin to guard against a production glitch. A temporal safety margin can be added to (1)(c) above, to provide room for error. A restaurant may produce patties by issuing a new cook command when $T_i$ drops to zero (or near zero, given a safety margin).

Estimating Demand for a Completed Product

Impending completed product demand may be estimated (i.e., product uncertainty modeling at block 88, FIG. 4) from consumer volume using methods similar to those employed to manage a component buffer. A distinction between component and completed product buffering is volume. In general, far fewer completed products are buffered than product components because many consumers require a special order and secondary shelf life for completed products is considerably shorter than that for food product components (e.g., burger patties).

Most quick-service restaurants have one or two sandwiches or hamburgers that dominate sales volume—and generally, one or two favored "preparations" for these sandwiches. For example, regular and plain cheeseburgers are likely to dominate many quick-service restaurants' sales volumes. Thus, an intuition behind this method of estimating demand for a completed product is that, if a human restaurant manager were able to closely monitor the number of patrons on the restaurant property, he or she would likely be able to predict that, "If there are 10 people out there, 2 of them are going to order a regular cheeseburger". In other words, the restaurant manager is intuitively calculating that this popular item will probably subsume 20% of the future orders for this group of consumers. Moreover, the manager's confidence is relatively high because there are 10 people out there—a statistically relevant sampling for this application. The method described herein seeks to automate this intuitive process by predicting when sufficient demand is present to justify confidence in deciding that it is time to pre-produce a specific completed sandwich.

An "expected value" or the "expected number of completed food products" that may be required over a predetermined time period may be found by multiplying the "expected value per order" by N (the number of unplaced orders). Several queue simulation methods have been described hereinbefore to estimate the number of unplaced orders on the restaurant property. A method of estimating the "expected value per order" for each completed food product is described later hereinbelow.

The "expected value" for a completed food product is the number of food products that the buffer manager 20 expects that N unplaced orders will require, based on the restaurant's then-current product mix. A human restaurant manager may want to order the kitchen crew to produce with either more or less confidence than the buffer manager 20, thus a "confidence filter" may be applied to the "expected value." For example, in one embodiment, t: expected value may simply be multiplied by a gain, to produce a modified expected value. The gain itself may be a function of a second measure of the confidence that the completed product will actually be consumed within its secondary shelf life. The calculation of the mean time between orders (MTBO) for that particular product may serve as a secondary confidence measurement. The MTBO value may be scaled to produce an appropriate gain.

Further, the classification of automobiles (e.g., mini-vans vs. pickup trucks) and/or people (e.g., adult, child, male, female) may be used to modify the expected value for that particular order. Classification techniques can be used to improve completed product estimates for single orders. Intuitively, a restaurant manager may be able to guess that vehicles likely to contain children will have a higher probability of ordering children's meals, which contain, for example, single hamburgers or chicken nuggets. Similarly, restaurant managers may notice that construction vehicles are more likely to contain occupants who will order larger, meatier sandwiches, such as a burger with two or more patties. The classification of vehicles into vehicle types may be used to improve the expected value for that particular order. Thus, the identification of a vehicle as a "mini-van" would enable the buffer manager 20 to increase the probable consumption of hamburgers and nuggets, and decrease the probable consumption of large sandwiches. Similarly, the classification of people as adult, child, male, female, etc. can be used to narrow the expected consumption for particular completed food products—and by extension, food product components.

Expected Value Per Order for a Single Product

As discussed hereinbefore, a queue simulator (i.e., the queue simulator or simulators selected for implementation as part of the buffer manager program code) outputs the expected time for each consumer order. The following describes a method for estimating the number of products, of a single type (cg., cheeseburgers, fries, onion rings, etc.), that may be ordered in a single consumer order. In other words, the method described below attempts to answer the question: For each consumer order placed, how many cheeseburgers (as an example of a type of food product) does the human restaurant manager expect to be ordered through each such consumer order?

The expected value per order may be calculated by filtering the restaurant's order data over a specific time window. In one embodiment, filtering generally means an averaging, though weighted averaging may be more appropriate. Sales of individual products may be recorded and averaged using any standard or batch averaging technique. It is noted that products should preferably be tracked according to their completed state. Thus, for example, plain cheeseburgers may be tracked separately from cheeseburgers with ketchup only. Further, weighting factors may be included to skew the average toward more recent sales. Other filtering techniques may be used to average out (or eliminate) anomalous events, such as the sudden sale of a very large number of products—for instance, the sudden sale of 25 cheeseburgers. These and other filtering techniques may be necessary to maintain smooth, convergent behavior of the expected value of an individual product. Filtered individual product sales may be normalized by the number of orders placed or normalized by the number of vehicles detected to generate the expected value per order for that individual product.

Buffer State Maintenance

The current state of a buffer may be maintained by collecting data from the kitchen employees (input block 90, FIG. 4) and updating a buffer state database that may be maintained internally (e.g., stored on the computer 20 running the buffer manager program code) by the buffer manager 20. The buffer management system 18 may use multiple touch screen monitors (not shown as part of the system 18 illustrated in FIG. 2) to collect production data from, for example, the grill, fry machines, and food product assembly area. The data may also be collected from the point-of-sale system. Generally, the production data (at block 90) may cover the production of every food product component and its addition to the buffer, the production of a completed product; and the waste of components and/or completed products. The removal of product components from the buffer may be calculated from a usage menu associated with the completed product. Thus, as an example, for every double cheeseburger made, two burger patties may be removed from the component buffer.

Estimating Average Service Times

Queuing theoretic models require the estimation of various service times at stations throughout the queue where services are performed prior to the object moving on to the next station. Average service times may be estimated by taking direct measurements of the service processes or through the use of a standard parametric observer. In one embodiment, service times may be estimated from direct measurements at each restaurant. For example, a rough estimate of the service time may be taken with a stopwatch. It is observed that the average service times may not tend to vary considerably, thus estimates may be stable for long periods of time.

For those applications where service times do vary over time, direct measurement of the various events may be taken using, for example, the vision system. For example, by time-stamping the progress of an object from entrance, to parking, or into the drive-thru lane, various in-transit times may be estimated. Drive-thru and counter service times may be estimated either by using the vision system to mark the forward progress of the queues, or by time-stamping consumer order data and noting the time elapsed between orders.

More sophisticated methods, such as the construction of a formal parametric observer to optimally estimate each of the average service times by filtering together the several measurements previously noted may also be implemented. These methods are well known. It is, however, noted that the use of such sophisticated methods may not produce appreciably better restaurant performance in many applications than the performance produced by the less sophisticated methods previously mentioned.

An Exemplary Implementation

Figure 8:
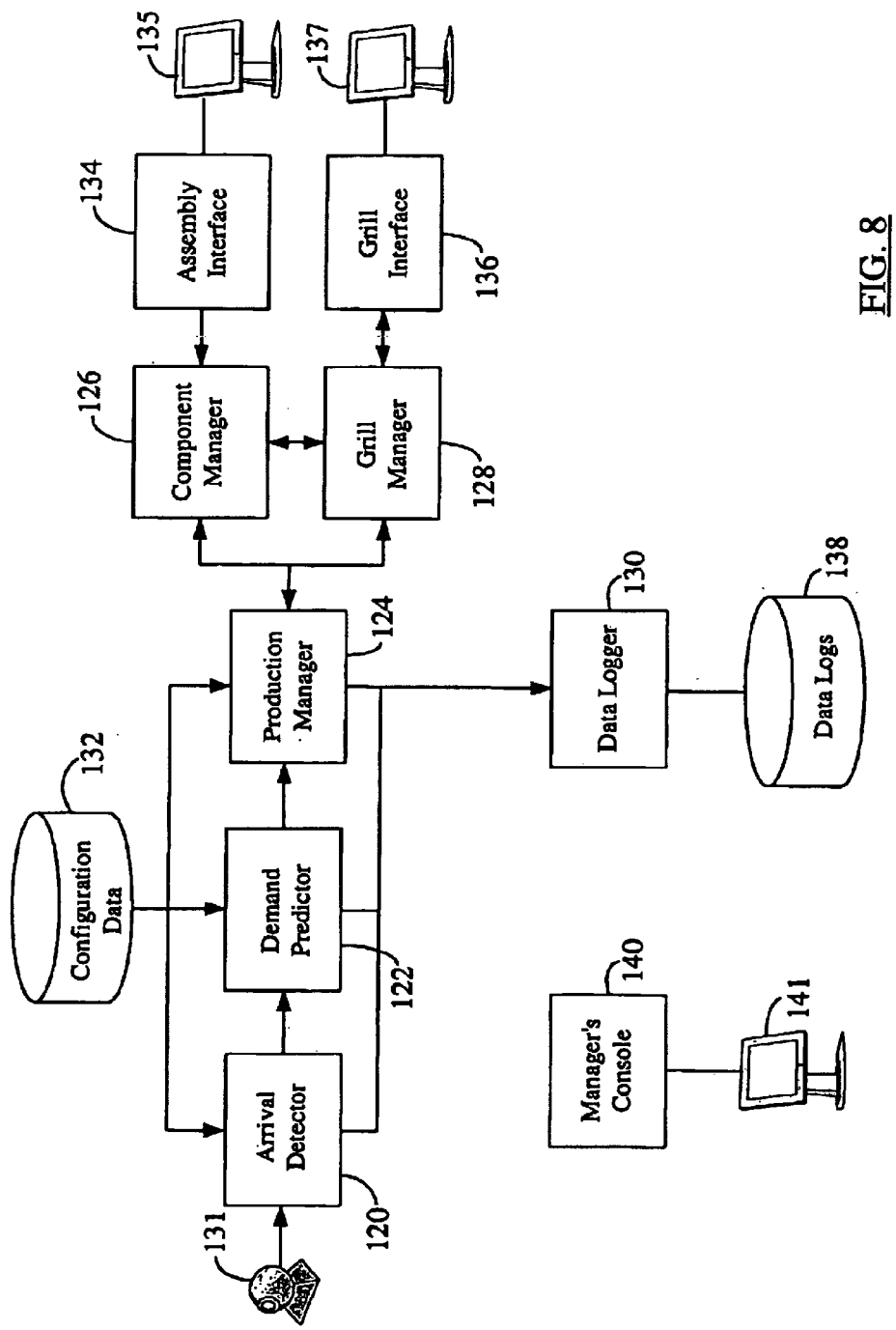
FIG. 8 individually depicts various functional elements constituting the buffer manager system according to a preferred embodiment of the present invention.

FIG. 8 individually depicts various functional elements constituting the buffer manager system 18 according to a preferred embodiment of the present invention. As illustrated in FIG. 8, the major elements (including software modules) in the buffer manager system 18 include the arrival detector 120, the demand predictor 122, the production manager 124, the component manager 126, the grill manager 128, and the data logger 130. These elements cooperate with one another to implement various steps illustrated in FIG. 4. Because of the earlier detailed discussion of all the steps illustrated in FIG. 4, a detailed discussion of various modules or elements shown in FIG. 8 is not given. However, a brief description of each module is given hereinbelow for ease of reference.

Arrival Detector

As discussed earlier hereinbefore, the arrival detector 120 analyzes a live stream of images supplied by, for example, an entrance camera 131 and signals a software event when a car has entered the restaurant property.

Demand Predictor

The demand predictor 122 uses the car arrival events generated by the arrival detector 120 to generate an estimate of near-term demand for individual food product components (e.g., burger patties). In a preferred embodiment, the demand predictor 122 simply counts the number of car arrivals in the last M seconds and multiplies this count by a demand factor D to produce a projected near-term demand estimate E for each food product component of interest: The list of these components of interest, as well as the individual value of M and D for each component, is retrieved from the configuration database 132. The demand predictor 122 may update its estimates E once every second as well as immediately upon a car arrival event.

Production Manager

The production manager's 124 primary function is to coordinate the operations of the component manager 126 and the grill manager 128.

Component Manager

The component manager 126 is responsible for tracking the actual levels of available food product components in the staging buffer, as well as computing the proper amount of additional components needed to maintain an appropriate buffer level and satisfy impending demand. Tracking of current-buffer levels is accomplished by monitoring the input supplied by the kitchen crew via the assembly and grill interfaces 134, 136 and their respective hardware data input/display monitors 135, 137. The grill interface 136 informs the component manager 126 of actual production events (i.e. supply of new components to the buffer), while the assembly interface 134 signals when and how many units of a particular component are withdrawn from the buffer to assemble sandwiches. The component manager 126 may also generate a value called "buffer deficit" for each buffered component. This value indicates the number of components needed, in addition to the current amount on hand. The deficit number is the sum of two components: Target Deficit and Projected Demand. The target deficit is the difference between the current target level and the current actual buffer level, while projected demand is the output from the demand predictor 122. The current target level is obtained from a "buffer schedule" stored in the configuration database 132. This schedule contains the appropriate target levels, as determined by the human restaurant manager, for particular time periods of the day.

Grill Manager

The grill manager 128 determines when to inform the kitchen crew in the restaurant's grill section that a batch of a particular food product component should be cooked. In order to make the production decision, the grill manager 128 may consider the current buffer deficit value computed by the component manager 126 as well as the "batch size" in effect for a particular component, i.e., the number of components that should be cooked simultaneously. Batch sizes for each component are part of the buffer schedule so that different values may be in effect during different times of the day. In one embodiment, a production decision is signaled whenever the current buffer deficit exceeds one-half of the current batch size. The grill manager 128 sends this decision event to the grill interface 136 to be displayed on the terminal 137 for the grill crew.

Assembly Interface

The assembly interface module 134 implements the user-interface code to drive the touch-screen 135 located in the food assembly area. Assembly crewmembers touch button areas on the screen 135 to indicate the type and number of sandwiches they are producing to fill customers' orders. This information is then sent to the component manager 126.

Grill Interface

The grill interface module 136 implements the user-interface code to drive the touch-screen 137 located, for example, above a grill. It may always display the current buffer levels, as well as indicating when a production decision was received by the grill manager 128. In the latter case, the desired batch size may be displayed as well. Crewmembers may respond by touching corresponding button areas on the screen 137 to tell the grill manager 128 when they have started a cooking cycle. The grill interface 136 conveys this information to the grill manager 128.

Data Logger

The data logger 130 collects operational data across the entire buffer management system and writes them to a database 138 for future reference or for troubleshooting.

Manager Console

The manager's console 140 may be a back-office user interface module that allows the human restaurant manager to monitor the whole food preparation and delivery operations and adjust operational parameters (of one or more software modules in FIG. 8) as needed using the touch-screen monitor 141.

It is noted that the discussion hereinabove focused on "deterministic" or model-based methods of detecting vehicle and/or people on a restaurant's property. For example, the buffer manager 20 according to the present invention automatically produces a mapping from a leading indicator of demand (e.g., car and people counts) to a time-delayed production order for either food product components or completed food products. The foregoing discussion focused on a set of implementations that use so-called "deterministic" mappings—i.e., explicit models of the physical processes that relate leading demand measurements to production orders. However, it is noted that such explicit modeling is not required in order to yield the same result. Other "non-deterministic" or non-model based methods such as, for example, neural network-based methods, fuzzy logic-based methods, etc., may also be used for the same purpose. That is, a "non-deterministic" mapping may equally capture the mapping.

The foregoing describes a real-time buffer manager system that calculates optimal food buffer levels, for both completed products and product components, based on real-time counts of restaurant patrons throughout a restaurant's property. The real-time buffer manager employs a computer vision system, running a series of 2D image processing techniques that detect and track vehicles and people in several camera views. The system's cameras may be pointed at any of several key locations throughout the restaurant's property, including the property's entrance and exits, the drive-thru lane, the parking area, the restaurant's entrance and exit doors, and the front counter area. Patron counts are fed from the computer vision system into a queuing model that estimates when each patron will arrive at an ordering station. Simultaneously, a parametric observer takes inputs from the kitchen crew to track several key pieces of production information including the number of products and components in the food buffer, and average service times for ordering and production. The buffer manager estimates, in real-time, the probable demand for completed food products and food product components, based on the number of patrons detected and the estimated time for them to arrive at an ordering station. This information is displayed to the kitchen crew, who then can prepare the required food products and food product components. Thus, instead of analyzing historical sales data, the buffer manager according to the present invention electronically performs direct measurement of probable future demand, and electronically predicts, in real-time, what the future food product demand will be in a predetermined time (e.g., 3–5 minutes) immediately following the direct measurement of the demand.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of managing food production and delivery in real time comprising:
   electronically predicting, based on real time data, an amount of food to be ordered at a food outlet in a specified time interval immediately succeeding a generation of said real time data;
   preparing said amount of food predicted to be ordered;
   serving prepared food to patrons of said food outlet; and
   electronically performing at least one of the following in real time:
      estimating impending food product demand in view of said prediction of said amount of food to be ordered; and
      estimating demand for each completed food product available for consumption.

2. A real time food buffer management system comprising:
   means for electronically generating real time data about food consumers inside or in the vicinity of a food outlet; and
   means for electronically predicting, based on said real time data, an amount of food to be ordered by said food consumers in a predetermined time interval immediately following said generation of said real time data.

3. A system for managing food supply in real time comprising:
   a plurality of sensors placed inside and in the vicinity of a food outlet, wherein said plurality of sensors electronically tracks objects present inside and in the vicinity of a food outlet to generate electrical signals containing information about presence of food consumers inside and in the vicinity of said food outlet; and
   a computer containing a program code, which, upon execution by a processor in said computer, causes said processor to perform the following in real time:
      analyze said electrical signals to generate digital data about said food consumers, and
      predict, based on said digital data, an amount of food to be ordered by said food consumers in a predetermined time interval immediately following generation of said digital data.

4. A computer-readable data storage medium containing a program code, which,
   upon execution by a processor, causes said processor to perform the following in real time:
   generate data about food consumers inside or in the vicinity of a food outlet; and
   predict, based on said data, an amount of food to be ordered by said food consumers in a predetermined time interval immediately following said generation of said data.

5. The data storage medium of claim 4, wherein said program code, upon execution, causes said process to further perform at least one of the following in real time:
   estimate impending food product demand in view of said prediction of said amount of food to be ordered; and
   estimate demand for each completed food product available for consumption.

6. A method of managing food supply in real time comprising:
   electronically generating real time data about food consumers inside or in the vicinity of a food outlet; and
   electronically predicting, based on said real time data, an amount of food to be ordered by said food consumers in a predetermined time interval immediately following said generation of said real time data.

7. The method of claim 6, wherein electronically generating real time data includes electronically tracking objects present inside or in the vicinity of said food outlet to identify presence of said food consumers and to count a number of said food consumers present inside or in the vicinity of said food outlet.

8. The method of claim 6, wherein electronically predicting said amount of food to be ordered includes electronically performing the following in real time:

selecting one or more queuing models from a plurality of queuing models;

inputting relevant portions of said real time data into respective one or more queuing models selected; and simulating each of said one or more queuing models after inputting said relevant portions of said real time data thereinto.

9. The method of claim 8, where said plurality of queuing models includes a zero queue model; a single queue model; a single queue, multiple station model; and a multi queue model.

10. The method of claim 6, further comprising electronically performing at least one of the following in real time:

estimating impending food product demand in view of said prediction of said amount of food to be ordered by said food consumers; and estimating demand for each completed food product available for consumption.

11. The method of claim 10, wherein estimating impending food product demand includes electronically performing at least one of the following:

estimating a desired nominal component buffer level, wherein said component buffer level includes a plurality of bins of food product components;

estimating remaining time for each of said plurality of bins before each said bin runs out of corresponding food product components; and estimating time required to fill one of said plurality of bins with corresponding food product components when said bin becomes empty.

12. The method of claim 10, wherein estimating impending food product demand includes displaying estimated food product demand on a display terminal.

13. The method of claim 10, wherein estimating demand for each completed food product includes estimating said demand for each said completed food product using a food production data input received from an employee of said food outlet.

14. The method of claim 6, wherein electronically generating said real time data includes at least one of the following:

placing a first plurality of sensors inside said food outlet to generate, in real time, a first information about potential food consumers inside said food outlet;

placing a second plurality of sensors around said food outlet to generate, in real time, a second information about human and automobile traffic flow external to said food outlet and in the vicinity thereof; and electronically analyzing said first and said second information in real time to generate said data about said food consumers.

15. The method of claim 14, wherein said first information includes indications of one or more of the following:

whether said potential food consumers are present inside said food outlet;

a total number of said potential food consumers inside said food outlet;

a direction of motion of one or more of said potential food consumers;

whether one or more of said potential food consumers are placing food orders;

a food ordering pattern of each of said potential food consumers that is placing a food order; and how long it takes for an employee of said food outlet to receive said food order.

16. The method of claim 14, wherein said second information includes indications of one or more of the following:

direction of movement of said human and said automobile traffic flow including: whether one or more humans in said human traffic are entering or exiting the property of said food outlet, and whether one or more vehicles in said automobile traffic are entering or exiting the property of said food outlet;

a total number of human food consumers entering and exiting said food outlet;

a total number of vehicles constituting said automobile traffic;

whether said human and automobile traffic is present on the property of said food outlet;

whether one or more vehicles in said automobile traffic are entering or exiting a drive-thru food order lane on the property of said food outlet; and a total number of vehicles entering or exiting said drive-thru lane.

17. The method of claim 14, wherein said real time data includes one or more of the following:

a first amount of time that it takes, on average, for one of said potential food consumers to wait prior to placing a food order;

a first number of potential food consumers inside said food outlet;

a second number of vehicles on the property of said food outlet;

a third number of automobiles in a drive-thru food order lane on the property of said food outlet;

a second amount of time that it takes, on average, for an automobile to remain in said drive-thru lane prior to arriving at a drive-thru ordering window;

a third information about a corresponding ordering pattern of each food consumer present inside said food outlet or in said drive-thru lane;

for each food consumer entering said food outlet, a corresponding fourth amount of time that it takes for each said human food consumer to walk to a food order panel inside said food outlet after entering the property of said food outlet; and for each food order received, a corresponding fifth amount of time that it takes for an employee of said food outlet to receive each said food order.

18. The method of claim 14, wherein electronically analyzing said first and said second information includes electronically performing at least one of the following in real time:

processing said second information to identify and count vehicles constituting said automobile traffic external to and in the vicinity of said food outlet;

further processing said second information to identify and count vehicles present in a drive-thru food order lane on the property of said food outlet; and processing said first and said second information to identify and count humans inside and in the vicinity of said food outlet.

19. The method of claim 14, wherein at least one of said first and said second plurality of sensors is one of an electrical sensor; a mechanical sensor; and a chemical sensor.

20. The method of claim 19, wherein said electrical sensor is one of a magnetic loop sensor; a laser beam switch; and a camera.

21. The method of claim 19, wherein said mechanical sensor is one of a piezo-electric switch; and a pneumatic pressure switch.

22. The method of claim 19, wherein said chemical sensor is a device that measures changes in CO (carbon monoxide) emissions.

* * * * *